US012314447B1

(12) United States Patent
Wylie et al.

(10) Patent No.: US 12,314,447 B1
(45) Date of Patent: *May 27, 2025

(54) SYSTEMS AND METHODS FOR CANDIDACY DETERMINATIONS AND REQUEST PROCESSING WHILE MAINTAINING USER DATA ANONYMITY

(71) Applicant: Capital One Services, LLC, McLean, VA (US)

(72) Inventors: Kevin C. Wylie, Midlothian, VA (US); David Shapiro, Arlington, VA (US); SrinivasRao Alaparthi, Elk Grove Village, IL (US); Kerry G. Fulcher, Chesapeake, VA (US); Jorge Murillo, Midlothian, VA (US); Daljeet Singh Sarna, Aldie, VA (US); Martin W. Dewey, Sandy Hook, VA (US); Tony George, Clarksburg, MD (US); Manish Srivastava, Glen Allen, VA (US); Morgan Organt, Washington, DC (US); Susanne Edmunds, Henrico, VA (US); Benjamin Thomas Jones, Midlothian, VA (US); Kevin P. Gleaton, Lake Zurich, IL (US); Taylor Li, Cleveland, OH (US); Ramachandra Kancharla, Glen Allen, VA (US); Deepak Kumar Soni, Chantilly, VA (US); Kaushik Vakharia, Naperville, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/802,673

(22) Filed: Aug. 13, 2024

Related U.S. Application Data

(63) Continuation of application No. 18/443,591, filed on Feb. 16, 2024, now Pat. No. 12,086,288.

(Continued)

(51) Int. Cl.
*G06F 21/62* (2013.01)
*G06Q 40/03* (2023.01)
*G06Q 30/0251* (2023.01)

(52) U.S. Cl.
CPC ......... *G06F 21/6254* (2013.01); *G06Q 40/03* (2023.01); *G06Q 30/0251* (2013.01)

(58) Field of Classification Search
None
See application file for complete search history.

(56) References Cited

U.S. PATENT DOCUMENTS 8,108,245 B1 * 1/2012 Hosea ................... H04L 67/535
705/7.29
8,312,033 B1 11/2012 McMillan et al.
(Continued)

OTHER PUBLICATIONS

Nan-Chen Hsieh, "An integrated data mining and behavioral scoring model for analyzing bank customers", Expert Systems with Applications 27 (2004) 623-633.

*Primary Examiner* — Michael W Chao
(74) *Attorney, Agent, or Firm* — Bookoff McAndrews, PLLC

(57) ABSTRACT

A first system may receive first data of a user associated with a first identifier and second data of the user associated with a second identifier that exclude user identifying information from a first and second data source, respectively. A key may be received from a second system that associates the first and second identifier with a common identifier generated to preserve user anonymity at the first system. The key may be used to generate aggregated data for the user that includes (Continued)

the first and second data and is associated with the common identifier. The aggregated data may be processed to determine the user as a candidate for an offer set. The common identifier for the user is included in a candidacy list for the offer set, and provided to the second system to facilitate request processing associated with the presentation of the offer set to candidate users.

20 Claims, 11 Drawing Sheets

Related U.S. Application Data

(60) Provisional application No. 63/598,606, filed on Nov. 14, 2023.

(56) References Cited

U.S. PATENT DOCUMENTS

| | | | |
|---|---|---|---|
| 9,767,309 | B1 | 9/2017 | Patel et al. |
| 9,996,856 | B2 | 6/2018 | Chaouki et al. |
| 10,572,684 | B2* | 2/2020 | LaFever .................... H04L 9/16 |
| 10,977,685 | B1 | 4/2021 | Crites et al. |
| 11,170,130 | B1 | 11/2021 | Blumberg et al. |
| 11,669,866 | B2 | 6/2023 | Heiser, II et al. |
| 11,758,210 | B1 | 9/2023 | Garib Herrera et al. |
| 11,921,888 | B2 | 3/2024 | Ren et al. |
| 11,922,456 | B1* | 3/2024 | Crider ................ G06Q 30/0246 |
| 12,147,996 | B2* | 11/2024 | Doumar .................. G06F 21/33 |
| 12,148,011 | B2* | 11/2024 | Doumar .................. H04L 67/02 |
| 2001/0049620 | A1 | 12/2001 | Blasko |
| 2002/0099824 | A1 | 7/2002 | Bender et al. |
| 2002/0174073 | A1 | 11/2002 | Nordman et al. |
| 2009/0077163 | A1 | 3/2009 | Ertugrul et al. |
| 2010/0042833 | A1 | 2/2010 | Platt |
| 2010/0293050 | A1 | 11/2010 | Maher et al. |
| 2011/0137975 | A1 | 6/2011 | Das et al. |
| 2011/0246273 | A1* | 10/2011 | Yarvis .................... G06Q 30/02 713/168 |
| 2011/0270661 | A1 | 11/2011 | Heiser, II et al. |
| 2011/0302025 | A1 | 12/2011 | Hsiao et al. |
| 2012/0054043 | A1* | 3/2012 | Agarwal ........... G06Q 30/0275 705/14.69 |
| 2012/0130805 | A1 | 5/2012 | On et al. |
| 2013/0262226 | A1 | 10/2013 | LaChapelle et al. |
| 2014/0032265 | A1 | 1/2014 | Paprocki |
| 2014/0089080 | A1 | 3/2014 | Tajima et al. |
| 2014/0365311 | A1 | 12/2014 | Eulenstein et al. |
| 2015/0040245 | A1 | 2/2015 | Guha et al. |
| 2015/0339686 | A1 | 11/2015 | Garcia et al. |
| 2016/0132938 | A1* | 5/2016 | Wiener ............. G06Q 30/0255 705/14.66 |
| 2016/0142379 | A1 | 5/2016 | Tawakol et al. |
| 2016/0239857 | A1* | 8/2016 | Milton ............. G06Q 30/0201 |
| 2016/0292722 | A1* | 10/2016 | Myers ................ G06Q 30/0243 |
| 2017/0053295 | A1* | 2/2017 | Tiell .................... G06F 21/6227 |
| 2017/0323334 | A1 | 11/2017 | Sheppard et al. |
| 2018/0096365 | A1* | 4/2018 | Noyes .................... G06Q 40/04 |
| 2018/0218173 | A1 | 8/2018 | Perkins et al. |
| 2020/0084023 | A1* | 3/2020 | Bessonov ........... H04L 63/0421 |
| 2021/0406950 | A1* | 12/2021 | Werner ................ H04L 63/045 |
| 2022/0092218 | A1 | 3/2022 | Efremov et al. |

\* cited by examiner

SYSTEMS AND METHODS FOR CANDIDACY DETERMINATIONS AND REQUEST PROCESSING WHILE MAINTAINING USER DATA ANONYMITY

CROSS-REFERENCE TO RELATED APPLICATION(S)

This patent application is a continuation of and claims the benefit of priority to U.S. Nonprovisional patent application Ser. No. 18/443,591, filed on Feb. 16, 2024, which claims the benefit of priority to U.S. Provisional Application No. 63/598,606, filed Nov. 14, 2023, all of which are incorporated by reference herein in their entireties.

TECHNICAL FIELD

Various embodiments of this disclosure relate generally to techniques for candidacy determinations and request processing, and, more particularly, to systems and methods for determining user candidacy for offer sets and processing pre-screen requests while maintaining anonymity of user data.

BACKGROUND

Offering entities, such as financial institutions, insurance institutions, etc., commonly leverage pre-screening techniques to present offer sets, including one or more products or services of the offering entities, to candidates. For example, when a candidate user has navigated to or launched an application on their device that is associated with an affiliate or client authorized by the offering entity to present at least one offer set to candidates, the user may be presented with a prompt that indicates they are a candidate (e.g., they are pre-approved, pre-screened, pre-selected) for the offer set, and includes an option to apply for the one or more products or services included in the offer set.

When credit-related data is utilized in determining user candidacy for the offer sets, Fair Credit Reporting Act (FCRA) regulations associated with pre-screening prohibit the offering entity from knowing an identity of the user until the offer set has been presented to the user. Therefore, to determine that the user is a candidate in a manner that is compliant with the FCRA regulations, conventional pre-screening techniques rely on a third party to determine candidates for the offer sets. For example, the offering entity may provide the third party with personally identifiable information (PII) and any internal data of the users to be considered in the candidacy determination, along with rules and/or models, which may be proprietary, for use by the third party in making the candidacy determination. The third party may receive credit-related data associated with the PII of the users from multiple credit bureaus, for example, and aggregate the credit-related data from each credit bureau with any internal data of the users. The third party may then run the rules and/or models on the aggregated data to identify a subset of the users as candidates for the offer sets.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for candidacy determinations and request processing. The methods and systems may include determining user candidacy for offer sets and processing pre-screen requests while maintaining anonymity of user data.

In an example, a method performed by a first system may include: receiving, from a first data source, first data of a user associated with a first identifier; receiving, from a second data source, second data of the user associated with a second identifier, wherein the first data and the second data exclude identifying information of the user; receiving, from a second system, a key that associates the first identifier, the second identifier, and a common identifier for the user generated by the second system to preserve an anonymity of the user at the first system, wherein the identifying information of the user is known and stored in association with the common identifier at the second system; generating, using the association of the first identifier and the second identifier provided by the key, aggregated data for the user that (i) includes the first data and the second data and (ii) is associated with the common identifier; processing the aggregated data to determine the user is a candidate for an offer set, of a plurality of offer sets; including the common identifier in a candidacy list for the offer set provided to the second system; receiving, from a client system configured to present one or more of the plurality of offer sets to candidate users, a request that includes a portion of the identifying information of the user; providing, to the second system, the portion of the identifying information and the offer set, wherein the second system uses the portion of the identifying information to determine the common identifier based on the stored association, and identifies the common identifier in the candidacy list for the offer set; receiving, from the second system, a candidacy indication that the user is a candidate for the offer set; and providing, to the client system, a response to the request, the response including the candidacy indication and one or more items of the offer set.

In a further example, a method for providing identity resolution may include: receiving, from a first data source, identifying information of a user associated with a first identifier; receiving, from a second data source, the identifying information of the user associated with a second identifier; determining the first identifier and the second identifier are associated with the user based on a match of the identifying information of the user; generating a common identifier for the user that excludes the identifying information of the user; generating a key associating the first identifier, the second identifier, and the common identifier; storing the identifying information of the user in association with at least the common identifier; providing the key to a candidacy determination system, wherein the candidacy determination system: uses the association of the first identifier and the second identifier provided by the key to generate aggregated data that includes first data associated with the first identifier received from the first data source and second data associated with the second identifier received from the second data source, and processes the aggregated data to determine the user is a candidate for an offer set; receiving, from the candidacy determination system, and storing a candidacy list for the offer set that includes the common identifier for the user; in response to a fulfillment system receiving a request associated with the user from a client system that is authorized to present the offer set, receiving, from the fulfillment system, a portion of the identifying information of the user included in the request and the offer set; using the portion of the identifying information to determine the common identifier based on the stored association; identifying the common identifier in the stored candidacy list for the offer set; and generating and providing, to the fulfillment system, an indication that the user is a candidate for the offer set.

In a further example, a method performed by a first system may include: for a plurality of users associated with the first system, identifying a subset of candidate users for an offer set, of a plurality of offer sets, the identifying including, for each user of the plurality of users: receiving, from a first data source, first data of the user associated with a first identifier; receiving, from a second data source, second data of the user associated with a second identifier, wherein the first data and the second data exclude identifying information of the user; receiving, from a second system, a key that associates the first identifier, the second identifier, and a common identifier for the user generated by the second system to preserve an anonymity of the user at the first system, and wherein the identifying information of the user is known and stored in association with the common identifier at the second system; generating, as part of a data pool, and using the association of the first identifier and the second identifier provided by the key, aggregated data for the user that (i) includes the first data and the second data and (ii) is associated with the common identifier; and processing the aggregated data to determine the user as a candidate for the offer set; generating and providing, to the second system, a candidacy list for the offer set that includes the common identifier for each of the subset of candidate users; receiving, from a client system configured to present one or more of the plurality of offer sets to candidates, a request that includes a portion of the identifying information of a first user of the plurality of users; determining the client system is authorized to present the offer set from the plurality of offer sets; providing, to the second system, the portion of the identifying information and the offer set, wherein the second system determines whether the first user is one of the subset of candidate users for the offer set by using the portion of the identifying information to determine a common identifier for the first user based on the stored association, and determining whether the common identifier is included in the candidacy list for the offer set; receiving, from the second system, an indication of whether the first user is a candidate for the offer set; and providing, to the client system, a response to the request based on the indication.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed aspects.

DETAILED DESCRIPTION

Figure 1:
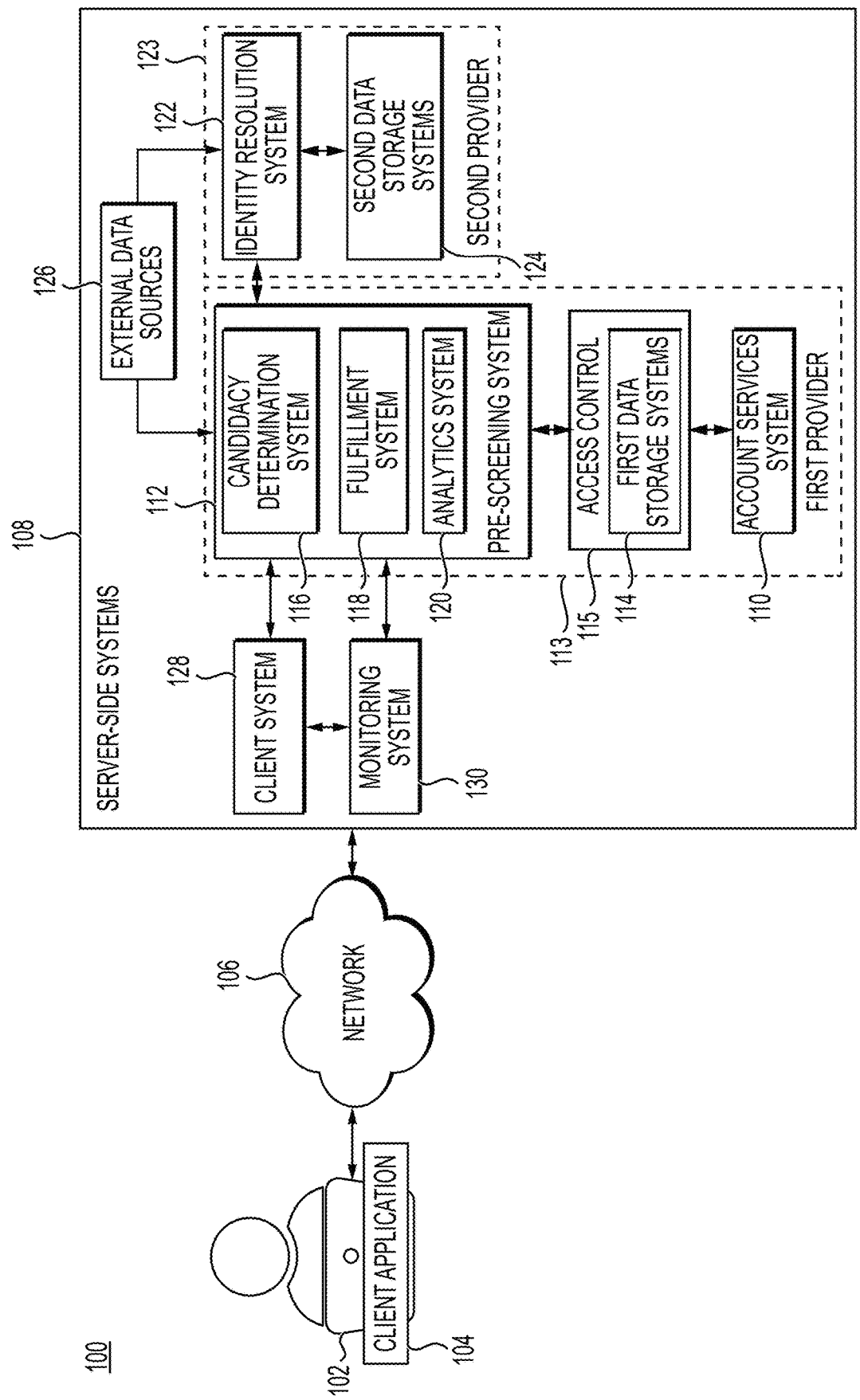
FIG. 1 depicts an example environment for candidacy determinations and request processing, according to certain aspects.

According to certain aspects of the disclosure, methods and systems are disclosed for candidacy determinations and request processing. As will be discussed in more detail below, in various embodiments, systems and methods are described for determining user candidacy for offer sets and processing pre-screen requests while maintaining anonymity of user data.

As briefly discussed in the background, when credit-related data is a basis for determining user candidacy for offer sets provided by an offering entity, conventional pre-screening techniques may rely on a third party to determine the candidates for the offer sets. For example, the offering entity may provide the third party with the PII and any internal data of the users to be considered in the candidacy determination, along with rules and/or models, which may be proprietary, for use by the third party in making the candidacy determination. The third party may receive credit data associated with PII of the users from multiple credit bureaus, for example, and aggregate the credit data from each credit bureau with any internal data of the users. The third party may then run the rules and/or models of the offering entity on the aggregated data to identify a subset of the users as candidates for the offer sets.

These conventional pre-screening techniques require the sharing of sensitive data, such as the PII of the user and proprietary rules and/or models of the offering entity, between the offering entity and the third party, which may carry significant risk. For example, the sensitive data may be vulnerable to a data breach as the sensitive data is being transferred to the third party and/or once stored by the third party. Additionally, using conventional pre-screening techniques, when a pre-screen request for a user who is a candidate for an offer set is received and responded to by the third party (e.g., resulting in an offer presented to the user), only limited data associated with the request and the user may be provided from the third party to the financial institution. Resultantly, types of analytics data associated with the pre-screening processes that can be collected and analyzed by the offering entity may be restricted due to the limited data provided by the third party.

To address these challenges, systems and methods are described herein for enabling candidacy determinations and request processing to be performed internally by a first system associated with the offering entity (e.g., a pre-screening system), while maintaining anonymity of user data for regulatory compliance by leveraging identity resolution services of a second system associated with a third party (e.g., an identity resolution system) to facilitate the candidacy determinations and request processing.

In an exemplary use case, the first system associated with the offering entity, such as a financial institution, may receive external data of a user from a plurality of external data sources. For example, the external data may include similar types of credit-related data from different credit bureaus that is to be considered for candidacy determinations. The external data from each external data source may be associated with a different external identifier and exclude any identifying information of the user. Therefore, when initially received, the first system may have no way of knowing or understanding the external data of the user from the various external data sources as being data of a same user.

However, a key may be received from the second system associated with the third party providing identity resolution services to the offering entity. The key may serve as a mechanism to enable the first system to know or understand that the external data of the user received from the various external data sources is associated with the same user, but without knowing an identity of the user. For example, the key may associate the external identifiers with a common identifier generated by the second system to preserve the anonymity of the user at the first system. To generate the key, the second system may receive the identifying information of the user in association with each of the external identifiers from the external data sources, and determine the external identifiers are associated with the user based on a match of the identifying information of the user. Based on the determined match, the system may generate the common identifier for the user, associate the external identifiers and the common identifier in the key, and provide the key to the first system. Resultantly, the first system may use the key to consolidate the external data of the user, and associate the consolidated external data with the common identifier without compromising the identity of the user.

Additionally, one or more trained models and/or feature derivation rules associated with the offering entity may be applied by the first system to the consolidated external data to generate scores and/or derived features. The scores and/or derived features may be associated with the common identifier and aggregated with the consolidated external data for use in the candidacy determinations.

Further to the aggregated external data, scores, and/or derived features, internal data of the first system may be considered by the first system for candidacy determinations. The internal data, as stored by the offering entity, may include a relevant data portion or data attributes for use in the candidacy determinations, an internal identifier, and the identifying information of the user. To be able to include the internal data as part of the aggregated data in a manner that preserves anonymity of the user data, the first system may divide the internal data into a first dataset and a second dataset. The first dataset may include the internal identifier and the identifying information but excludes the relevant data portion or data attributes. The second dataset may include the internal identifier and the relevant data portion or data attributes but excludes the identifying information. The first system may provide the first dataset and the second dataset to the second system. The second system may use the identifying information from the first dataset to retrieve the common identifier, and generate a third dataset including the relevant data portion or data attributes from the second dataset and the common identifier. The first system may receive the third dataset from the second system, and may use the common identifier from the third dataset to identify and include the relevant data portion or data attributes from the third dataset in the aggregated data for the user.

Aggregated data may be similarly generated for each user of a plurality of users and associated with the common identifiers of the user to form a data pool. A plurality of candidate datasets including the common identifier and the aggregated data from the data pool may be generated for the plurality of users. The first system may process the data pool (e.g., by processing the candidate datasets) to determine candidacy of users for a plurality of offer sets. For example, a candidacy list may be generated for each of the plurality of offer sets. The candidacy list may include a subset of common identifiers for a subset of the users determined to be candidates for the respective offer set. Additionally, the candidacy list may include metadata describing or otherwise referencing a subset of the candidate datasets corresponding to the subset of common identifiers that include the aggregated data that was used to make the candidacy determinations.

The candidacy lists for the offer sets may be provided to the second system for use in facilitating the presentation of the offer set to candidate users in response to receiving pre-screen requests for the users. For example, the first system may receive a request from a client application associated with a client system executing on a user device associated with one of the plurality of users. The request may include any portion of the identifying information of the user. The client system from which the request is received may be authorized or otherwise capable of presenting at least one offer set of the plurality of offer sets to candidate users. Accordingly, the first system may provide the second system the portion of the identifying information of the user and an identifier of the at least one offer set. The second system may use the portion of the identifying information to retrieve the common identifier for the user, use the identifier of the at least one offer set to retrieve a candidacy list for the at least one offer set, and determine whether the common identifier for the user is included in the candidacy list for the at least one offer set, and thus whether or not the user is a candidate for the at least one offer set. The first system may receive an indication from the second system of whether or not the user is a candidate for the at least one offer set, and generate a response to the request based on the indication to provide to the client system. When the indication included in the response is that the user is a candidate, the client system may present the at least one offer set to the user and may further interact with the first system to provide additional presentment-related details, as described in detail below.

In addition to the candidacy lists, the first system may provide the candidate datasets to the second system to enable provision of richer, more complete analytics data. The aggregated data included in the candidate datasets may be encrypted to mitigate risk when sharing the candidate datasets with the second system. The second system may generate analytics data associated with the processed pre-screen requests at predefined intervals. The analytics data may include a portion of the candidate datasets. For example, for a pre-screen request associated with a user that is received within the predefined interval and for which candidacy is determined for at least one offer set based on the common identifier for the user being included in the corresponding candidacy list, a candidate dataset including the common identifier for the user and the aggregated data (e.g., that was used to determine the user's candidacy) is included in the analytics data. For example, the metadata included in the candidacy list and the common identifier may be utilized to look up or identify the candidate dataset to include in the analytics data. The analytics data generated and provided to the first system may also now include identifying information of the user as the offer has been presented to the user based on the determined user candidacy. The first system may use the analytics data, among other data described in detail below, to perform one or more reconciliation processes.

While specific examples included throughout the present disclosure involve a financial institution as the offering entity that is providing one or more financial products and/or services as part of the offer set, it should be understood that techniques according to this disclosure may be adapted to any offering entity that may use credit-related data or other similarly regulated data as a basis for offer candidacy. It should also be understood that the examples above are illustrative only. The techniques and technologies of this disclosure may be adapted to any suitable activity.

Accordingly, reference to any particular activity is provided in this disclosure only for convenience and is not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" may convey "based at least in part on." The singular forms "a," "an," and "the" may include plural referents unless the context dictates otherwise. The term "exemplary" may be used in the sense of "example" rather than "ideal." The terms "comprises," "comprising," "includes," "including," or other variations thereof, may convey a non-exclusive inclusion such that a process, method, or product that comprises a list of elements does not necessarily include only those elements, but may include other elements not expressly listed or inherent to such a process, method, article, or apparatus. The term "or" may be interpreted disjunctively, such that "at least one of A or B" includes, (A), (B), (A and A), (A and B), etc. Similarly, the term "or" is intended to mean "and/or," unless explicitly stated otherwise. "And/or" may convey all permutations, combinations, subcombinations, and individual instances of items or terms included within a list of the items or terms.

Terms like "provider," "services provider," or the like may generally encompass an entity or person involved in providing, selling, and/or renting items to persons, as well as an agent or intermediary of such an entity or person. An "item" may generally encompass a good, service, or the like having ownership or other rights that may be transferred. An "offering entity" may be a provider using pre-screening to identify candidates for offer sets that included one or more items. As used herein, terms like "user" generally encompass any person or entity that has an account with the offering entity, an account with a client of the offering entity that provides offer presentation services to the offering entity, and/or any other person or entity (e.g., any consumer) whom the offering entity or client may have relevant contact information of to enable provision of offer presentations. The term "application" may be used interchangeably with other terms like "program," or the like, and generally encompasses software that is configured to interact with, modify, override, supplement, or operate in conjunction with other software.

FIG. 1 depicts an exemplary environment 100 for candidacy determinations and request processing, according to certain aspects, and which may be used with the techniques presented herein. A computing device 102 associated with a user or an agent interacting with the user may communicate with one or more of the other components of the environment 100 across electronic network 106, including one or more server-side systems 108, discussed below, to initiate a pre-screening process to determine the user's candidacy for one or more offer sets, for example. The environment 100 of FIG. 1 shows one computing device 102. However, in other examples, there may be a plurality of computing devices 102 that are each communicating with one or more server-side systems 108 to initiate similar pre-screening processes.

In addition to communicating with the computing device 102 across the electronic network 106, one or more components of the server-side systems 108 may communicate with one another across one or more other electronic networks similar to the electronic network 106 within the environment 100. The server-side systems 108 may include an account services system 110, a pre-screening system 112, and/or one or more first data storage systems 114 that are associated with a first provider 113. The first provider 113 may be a financial institution or other similar entity that generates offer sets associated with products and/or services of the first provider 113 to provide to candidates, where candidacy may be based in part on credit-related data or other similarly regulated data. The pre-screening system 112 may include a plurality of subsystems, such as a candidacy determination system 116, a fulfillment system 118, and/or an analytics system 120. In some examples, one or more of the first data storage systems 114 may be internal data storage systems of the first provider 113. Additionally or alternatively, one or more of the first data storage systems 114 may be external data storage systems hosted by a third party data storage service provider.

The server-side systems 108 may also include an identity resolution system 122 and/or one or more second data storage systems 124 that are associated with a second provider 123. The second provider 123 may be an identity resolution provider that provides identity resolution services to the first provider 113 to facilitate regulatory compliant pre-screening processes. In some examples, one or more of the second data storage systems 124 may be internal data storage systems of the second provider 123. Additionally or alternatively, one or more of the second data storage systems 124 may be external data storage systems hosted by a third party data storage service provider. The environment 100 of FIG. 1 shows one identity resolution system 122. However, in other examples, there may be a plurality of different identity resolution systems 122, where each of the identity resolution systems 122 may be associated with a different provider (e.g., a third provider, fourth provider, and so on) that provides identity resolution services to the first provider 113. Each of the different identity resolution service providers may have data storage systems hosted by the respective provider or a third party data storage service provider.

The server-side systems 108 may further include a plurality of external data sources 126 that provide external data of users to the pre-screening system 112 and/or the identity resolution system 122 for use in candidacy determinations. Additionally, the server-side systems 108 may include a client system 128 associated with a client of the first provider 113 that is configured to provide offer presentation services to the first provider 113. In other examples, the client system 128 may instead be an offer presentation system of the first provider 113 configured to present offers to candidate users. The environment 100 of FIG. 1 shows one client system 128. However, in other examples, there may be a plurality of different client systems 128, where each of the client systems 128 may be authorized to present one or more of the offer sets of the first provider 113. Further, the server-side systems 108 may include a monitoring system 130 that is configured to monitor an application process for any of the pre-screened offers presented to and applied for by candidates. The environment 100 of FIG. 1 shows one monitoring system 130. However, in other examples, there may be a plurality of monitoring systems 130, where each of the monitoring systems 130 may be configured to monitor one or more specific steps of the application process. Other components of the environment 100, such as the pre-screening system 112, the identify resolution system 122, and/or the client system 128 may also be configured to be perform independent monitoring processes.

The above-provided examples are exemplary and non-limiting. The systems and devices of the environment 100 may communicate in any arrangement. As will be discussed herein, systems and/or devices of the environment 100 may communicate in order to enable pre-screening of users for offer sets that leverages regulatory compliant candidacy determinations and request processing, among other activities.

The computing device 102 may be configured to enable the user or the agent to access and/or interact with other systems in the environment 100. For example, the computing device 102 may be a computer system such as, for example, a desktop computer, a laptop computer, a tablet, a smart cellular phone, a smart watch or other electronic wearable, etc. In some embodiments, the computing device 102 may include one or more electronic applications, e.g., a program, plugin, browser extension, etc., installed in a data storage device of the computing device 102, such as a drive, disk, or a memory of the computing device 102. In some embodiments, the electronic applications may be associated with one or more of the other components in the environment 100. For example, a client application 104 associated with the client system 128 may be executed on the computing device 102 to enable initiation of a pre-screen process for the user, and presentation of one or more offer sets of the first provider 113 if the user is determined to be a candidate for the one or more offer sets via the pre-screen process. In some examples, the applications, including the client application 104, may be thick applications installed locally on the computing device 102 and/or thin applications (e.g., web applications) that are rendered via the web browser launched on the computing device 102.

Additionally, one or more components of the computing device 102 may generate, or may cause to be generated, one or more graphic user interfaces (GUIs) based on instructions/information stored in the data storage device, instructions/information received from the other systems in the environment 100, and/or the like and may cause the GUIs to be displayed via a display of the computing device 102. The GUIs may be, e.g., application interfaces or browser user interfaces and may include text, input text boxes, selection controls, and/or the like. The display may include a touch screen or a display with other input systems (e.g., a mouse, keyboard, etc.) for the user to control the functions of computing device 102.

The account services system 110 may include one or more server devices (or other similar computing devices) for executing account services of the first provider 113 (e.g., of the financial institution or other similar entity). Example account services may broadly include tasks associated with: opening and managing accounts, maintaining user preferences or settings associated with the accounts, and providing internal data associated with the accounts to one or more of the first data storage systems 114, among other similar account-related services.

The pre-screening system 112 may include one or more server devices (or other similar computing devices) for executing services performed by the one or more subsystems of the pre-screening system 112, including the candidacy determination system 116, the fulfillment system 118, and/or the analytics system 120. Example services performed by the candidacy determination system 116 may broadly include tasks associated with: data ingestion and/or integration (e.g., extract, transform, and load (ETL) processes), internal data anonymization, data pool generation, candidate dataset generation from the data pool, and campaign execution on the candidate datasets to generate a plurality of candidacy lists including candidates for a plurality of offer sets. Example services performed by the fulfillment system 118 may broadly include tasks associated with the processing of pre-screen requests received from client systems 128 to provide an indication of user candidacy or a lack thereof for a subset of the offer sets that the client systems 128 are respectively authorized to present. Example services performed by the analytics system 120 may broadly include tasks associated with one or more reconciliation processes.

The first data storage systems 114 may include a server system or computer-readable memory such as a hard drive, flash drive, disk, etc. In some examples, the first data storage systems 114 may include and/or interact with an application programming interface for exchanging data to other systems, e.g., one or more of the other components of the environment 100, such as the account services system 110 and/or the pre-screening system 112. In other examples, one or more of the first data storage systems 114 may be a sub-system or component of the account services system 110 and/or the pre-screening system 112 (e.g., when the one or more of the first data storage systems 114 are also provided or hosted by the first provider 113 rather than a third party).

The first data storage systems 114 may include and/or act as a repository or source for various types of data that may be received, generated, and/or used for or in relation to the pre-screening processes performed by the various sub-system of pre-screening system 112. For example, the first data storage systems 114 may include a plurality of data stores, each storing one or more of the various types of data. Example types of data stored may include, but are not limited to, internal data of a plurality of users, anonymized external data of the users, data pool data including aggregated and anonymized data of the users, trained models, feature derivation rules, campaign rules, candidacy lists for offer sets and/or corresponding candidate datasets from which the candidacy lists are generated, pre-screen request data, analytics data, promotional inquiry data, monitoring data, and the like.

In some examples, and as illustrated in FIG. 1, one or more access control layers 115 limit access to a particular subset of the data stores within the first data storage systems 114. For example, certain types of data (e.g., non-anonymized internal user data) may be segregated from other types of data (e.g., anonymized user data in the data pool) by storing the data types in different subsets of one or more data stores within the first data storage systems 114. Access to the different subsets may be limited or restricted at a system level and/or at an administrative user level using one or a combination of roles, entitlements, and credentials. As one non-limiting example, the implementation of roles, entitlements, and/or credentials may enable pre-screen specific deployments within the pre-screening system 112 such that data access is limited to the subset of one or more data stores within the first data storage systems 114 storing the data pool that includes anonymous data of the users. Data access to remaining data stores of the first data storage systems 114 that include internal data of the users that is known and not anonymized, for example, is denied or otherwise restricted. The access control may help to prevent a potential bad actor from gaining access to both the anonymous data and the known data, and using any data overlaps between the anonymous data and the known data to attempt to determine an identity of users associated with the anonymous data.

The identity resolution system 122 may include one or more server devices (or other similar computing devices) for executing identity resolution services. Example identity resolution services may broadly include tasks associated with generating common identifiers and keys to enable the candidacy determination system 116 to aggregate anonymized external data of users, as well as anonymize and associate the anonymized internal data of the users with the aggregated external data, among other data, for use in candidacy determinations. Additionally, the tasks may include, as part of pre-screen request processing, parsing one or more candidacy lists for common identifiers of the users associated with the requests to determine user candidacy or lack thereof, and generating candidacy indications to provide to the fulfillment system 118 based on the determination. Also, the tasks may include generating analytics data associated with processed pre-screened requests at predefined intervals to provide to the analytics system 120. The analytics data generated may include a portion of the candidate datasets generated by and received from the candidacy determination system 116. Further, the tasks may include generating and providing promotional inquiries to the external data sources 126, as well as generating indications of the promotional inquiries to provide to the analytics system 120.

The second data storage systems 124 may include a server system or computer-readable memory such as a hard drive, flash drive, disk, etc. In some examples, the second data storage systems 124 may include and/or interact with an application programming interface for exchanging data to other systems, e.g., one or more of the other components of the environment 100, such as the identity resolution system 122. In other examples, one or more of the second data storage systems 124 may be a sub-system or component of the identity resolution system 122 (e.g., when the one or more of the second data storage systems 124 are also provided or hosted by the first provider 113 rather than a third party).

The second data storage systems 124 may include and/or act as a repository or source for various types of data that may be received, generated, and/or used for providing identity resolution in association with the candidacy determinations and request processing performed by the pre-screening system 112. For example, the second data storage systems 124 may include a plurality of data stores, each storing one or more of the various types of data. Example types of data stored may include, but are not limited to, generated common identifiers for users that are stored in association with identifying information for the users, generated keys that associate the common identifiers for users with different external identifiers provided by the external data sources 126 for the users, candidacy lists for offer sets, candidate datasets, analytics data, promotional inquiry data, and the like.

The external data sources 126 may each include one or more server devices (or other similar computing devices) for executing data provision services. Example data provision services may broadly include tasks associated with providing external data of the users to one or more systems of the first provider 113 and/or the second provider 123. In some examples, a subset of the external data sources 126 may provide different portions of the external data to each of the candidacy determination system 116 and the identity resolution system 122. For example, the subset of the external data sources 126 may each store identifying information of the users, external data of the users, and external identifiers generated by the respective external data sources 126 for the users that do not include any identifying information of the users. The external data may include data used and/or processed for use in the candidacy determinations performed by the candidacy determination system 116. However, the external data may be a type of data that, based on industry regulations, the identity of the user is to remain anonymous to the candidacy determination system 116. As a non-limiting example, the subset of the external data sources 126 may include systems of one or more credit bureaus that are configured to provide credit-related data for the users, where an identity of the users to which the credit-related data belongs cannot be known by the first provider 113 until certain actions occur (e.g., until after an offer is presented) to maintain compliance with FCRA. Therefore, and as described in more detail below, the subset of the external data sources 126 may provide only the external data and the external identifier for the users to the candidacy determination system 116, and may provide only the identifying information and the external identifier for the users to the identity resolution system 122.

In other examples, a remaining subset of the external data sources 126 may provide the identifying information of the users along with the external data of the users (e.g., provide non-anonymous external data) to the first provider 113 for storage within one or more data stores of the first data storage systems 114. For conciseness and clarity throughout the disclosure, such non-anonymous external data that is received and stored by the first provider 113 in the first data storage systems 114 may be referred to as or treated similarly to internal data of the first provider 113. For example, because the internal data stored is not anonymous, if the internal data is to be included or considered as part of the candidacy determinations performed by the candidacy determination system 116, the first provider 113 uses services of the identity resolution system 122 to anonymize the internal data, as described in detail below.

The client system 128 may include one or more server devices (or other similar computing devices) for executing offer presentation services. Example offer presentation services may broadly include tasks associated with: authenticating users via the client application 104; generating and providing pre-screen requests to the fulfillment system 118; generating and providing offer information requests to the fulfillment system 118 when the users are indicated as candidates responsive to the pre-screen requests, generating and causing display of offer presentation user interfaces via the client application 104 based on responses to the offer information requests, and providing offer presentation indications to the fulfillment system 118. Additionally, when the candidates select to apply for the offer presented, the tasks may further include sending signals to monitoring system 130 to initiate a monitoring of the application process. In some examples, the client system 128 or a different vendor of the first provider 113, including a system of the first provider 113 itself, may provide services for fulfilling offer presentations via other communication modalities than the client application 104, such as via direct mail to the users' physical mail addresses.

The monitoring system 130 may include one or more server devices (or other similar computing devices) for executing monitoring services in response to a candidate selecting to apply for a presented offer. Example monitoring services may broadly include tasks associated with: tracking information associated with the application process including referrals and/or a payment process, as well as compliance monitoring, including how the client system 128 is presenting the offer set.

The network 106 over which the one or more components of the environment 100 communicate may include one or more wired and/or wireless networks, such as a wide area network ("WAN"), a local area network ("LAN"), personal area network ("PAN"), a cellular network (e.g., a 3G network, a 4G network, a 5G network, etc.) or the like. In some embodiments, the network 106 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The computing device 102 and one or more of the server-side systems 108 may be connected via the network 106, using one or more standard communication protocols. The computing device 102 and one or more of the server-side systems 108 may transmit and receive communications from each other across the network 106, as discussed in more detail below.

Although depicted as separate components in FIG. 1, it should be understood that a component or portion of a component in the system of exemplary environment 100 may, in some embodiments, be integrated with or incorporated into one or more other components. For example, one or more of the first data storage systems 114 may be integrated with the pre-screening system 112, one or more of the second data storage systems 124 may be integrated with the identity resolution system 122, or the like. In some embodiments, operations or aspects of one or more of the components discussed above may be distributed amongst one or more other components. Any suitable arrangement and/or integration of the various systems and devices of the exemplary environment 100 may be used.

In the following disclosure, various acts may be described as performed or executed by a component from FIG. 1, such as the computing device 102 or one or more of the server-side systems 108, or components thereof. However, it should be understood that in various embodiments, various components of the exemplary environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 2A:
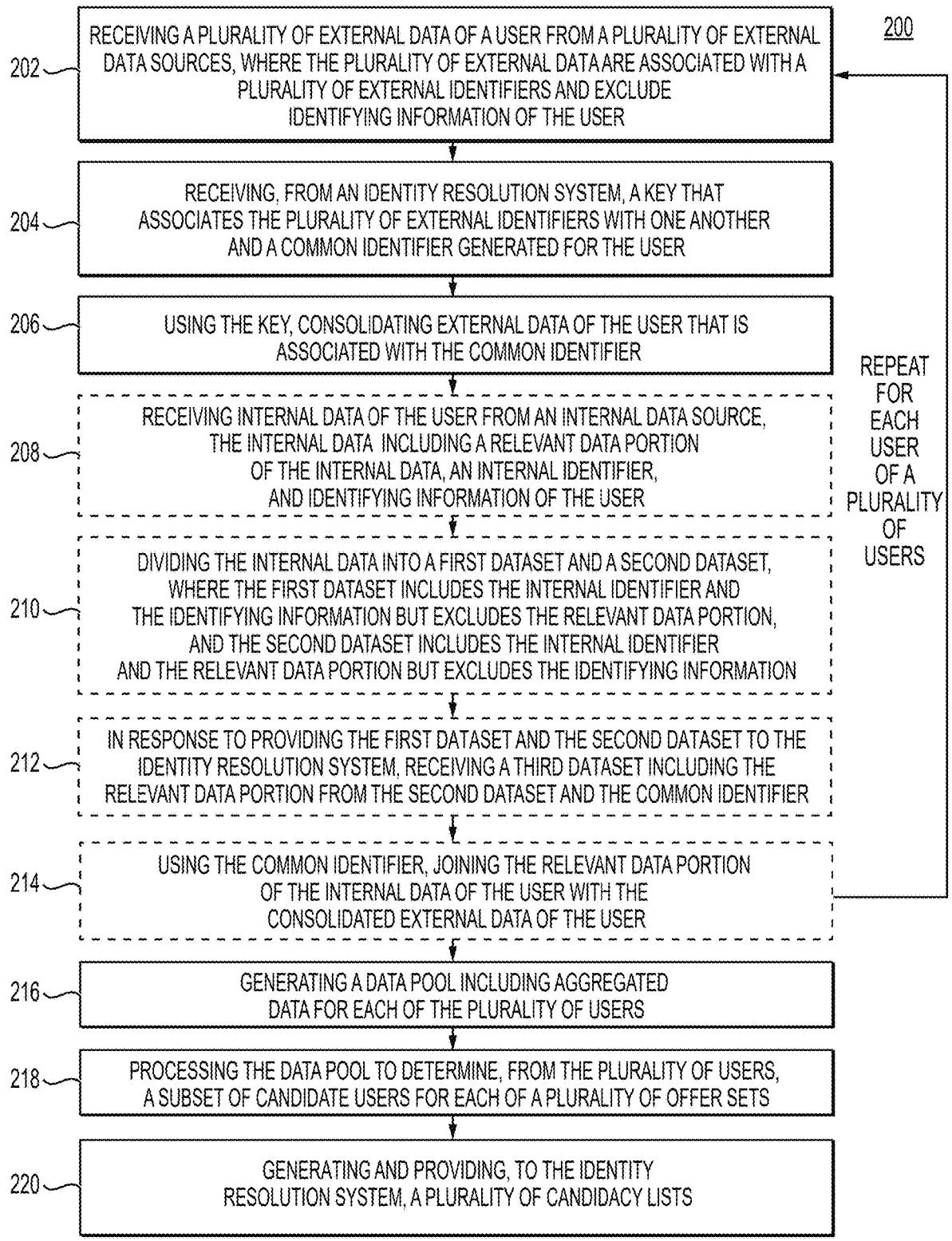
FIG. 2A depicts an example method for determining candidacy, according to certain aspects.
Figure 2B:
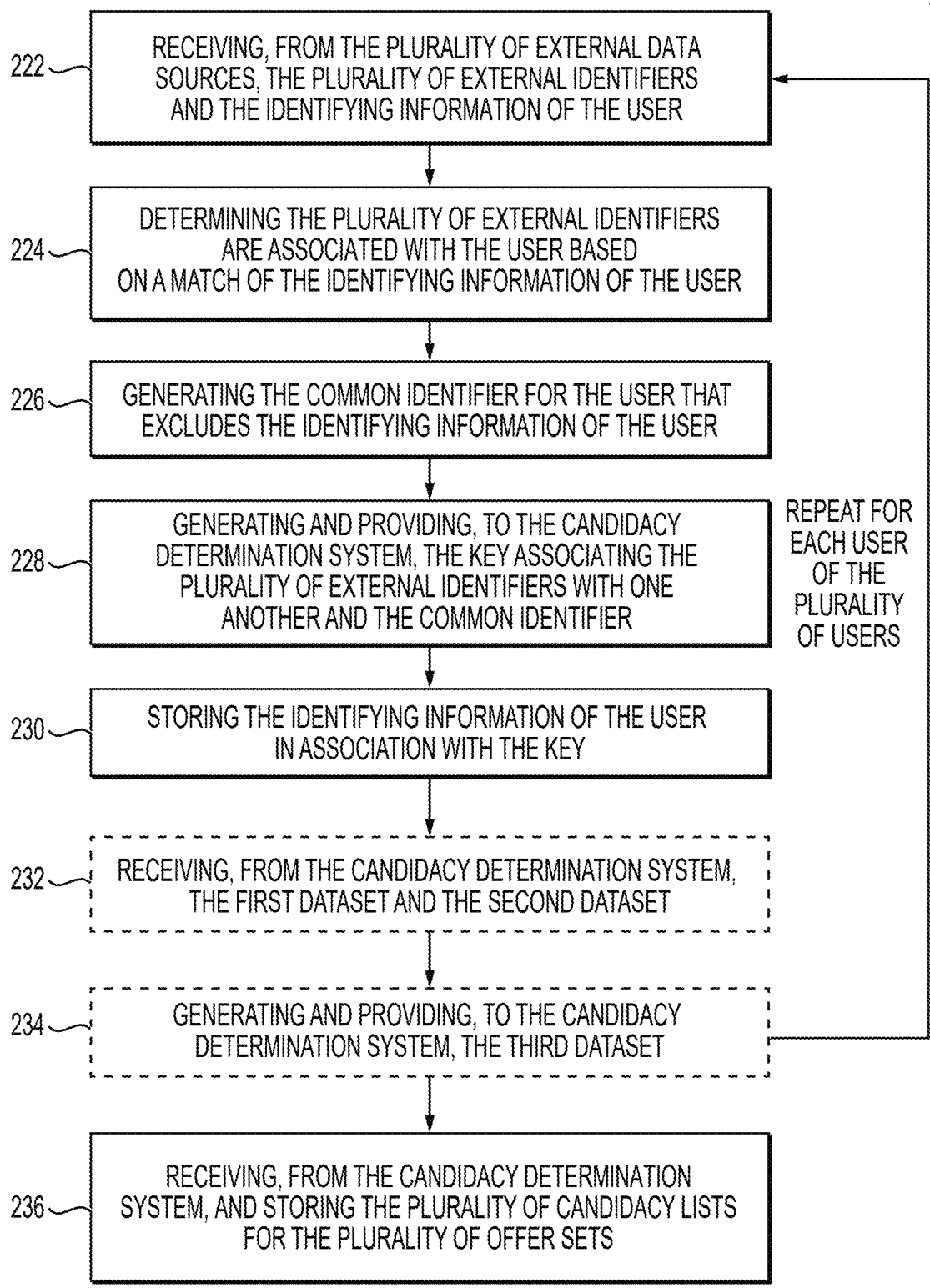
FIG. 2B depicts an example method for providing identity resolution in the candidacy determination process of FIG. 2A, according to certain aspects.
Figure 2C:
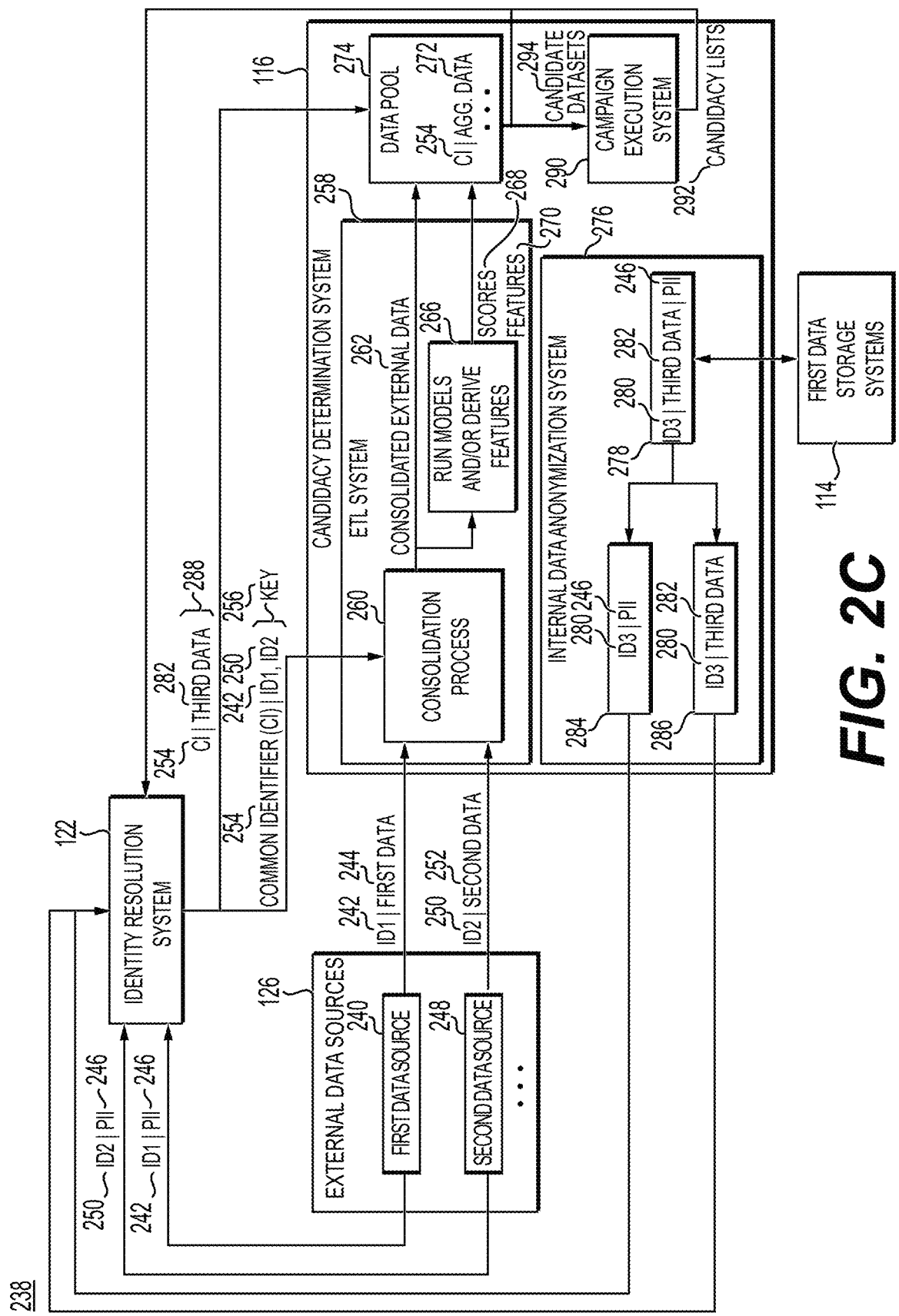
FIG. 2C depicts a conceptual diagram of the example methods described in FIGS. 2A and 2B, according to certain aspects.

FIG. 2A depicts an example method 200 for determining candidacy. FIG. 2B depicts an example method 221 for providing identity resolution in the candidacy determination method 200 of FIG. 2A. In some examples, various steps of the method 200 may be performed by the candidacy determination system 116, while various steps of the method 221 may be performed by the identity resolution system 122. FIG. 2C depicts a conceptual diagram 238 of the example methods 200, 221 described in FIGS. 2A and 2B to illustrate the interactions between the candidacy determination system 116 and the identity resolution system 122.

Referring concurrently to FIGS. 2A and 2C, at step 202, the method 200 of FIG. 2A may include receiving a plurality of external data of a user from the plurality of external data sources 126. The plurality of external data received may be associated with a plurality of external identifiers and exclude identifying information of the user.

As shown in FIG. 2C, the external data sources 126 may include at least a first data source 240 and a second data source 248. The first data source 240 may store first data 244 in association with (i) a first external identifier 242 generated by the first data source 240 for the user (e.g., ID1), and (ii) identifying information 246 of the user (e.g., (PII). The second data source 248 may store second data 252 in association with (i) a second external identifier 250 generated by the second data source 248 for the user (e.g., ID2), and (ii) the identifying information 246 of the user (e.g., PII). The first external identifier 242 and the second external identifier 250 generated for the user may be different from one another. Additionally, while the first data 244 and the second data 252 may be comprised of the same types of data, values for the types of values may vary.

To provide an illustrative example, the first data source 240 and second data source 248 may be associated with at least two different credit reporting agencies or credit bureaus that are providing credit-related data as the first data 244 and the second data 252. Example types of the credit-related data included in the first data 244 and the second data 252 may include a plurality of different types of credit-related data attributes. The identifying information 246 of the user may include a name, an address, a phone number, a social security number, a date of birth, and/or other PII. Certain external data sources 126 may provide more or less types of PII within the identifying information 246 of the user than others of the external data sources 126.

The external data received by the candidacy determination system 116 at step 202 from the first data source 240 may include the first external identifier 242 and the first data 244, but exclude the identifying information 246 of the user. Similarly, the external data received by the candidacy determination system 116 at step 202 from the second data source 248 may include the second external identifier 250 and the second data 252, but exclude the identifying information 246 of the user. The identifying information 246 of the user is specifically excluded to maintain regulatory compliance (e.g., FCRA compliance). Additionally, as previously mentioned, the first external identifier 242 and the second external identifier 250 may be different identifiers. Therefore, when the candidacy determination system 116 initially receives the first data 244 and the second data 252, the candidacy determination system 116 has no knowledge of or any way of identifying the first data 244 and the second data 252 as data of the same user because at no point is the identifying information 246 of the user provided to the candidacy determination system 116.

Again referring to FIGS. 2A and 2C concurrently, at step 204, the method 200 of FIG. 2A may include receiving, from the identity resolution system 122, a key 256 that associates the plurality of external identifiers, such as the first external identifier 242 and the second external identifier 250, with one another and a common identifier 254 (e.g., CI) generated for the user by the identity resolution system 122. As described in more detail below, the key 256 may be used by one or more systems of the first provider 113, including at least the pre-screening system 112, to aggregate any and all of the external data associated with the user that is received and of relevance for candidacy determinations. In other words, the key 256 provides a mechanism for identifying the first data 244 and the second data 252 as data of the same user, while continuing to preserve anonymity of the user as the common identifier 254 and/or the key 256 exclude any identifying information of the user.

Steps 222-228 of the method 221 of FIG. 2B describe aspects related to the generation of the common identifier 254 and the key 256 by the identity resolution system 122. For example, now referring to FIGS. 2B and 2C concurrently, at step 222, the method 221 of FIG. 2B may include receiving, from the plurality of external data sources 126, the plurality of external identifiers and identifying information of the user. Continuing the above-example where the external data sources include at least the first data source 240 and the second data source 248 and as shown in FIG. 2C, the identity resolution system 122 may receive the first external identifier 242 and the identifying information 246 of the user from the first data source 240, and the second external identifier 250 and the identifying information 246 of the user from the second data source 248.

At step 224, the method 221 may include determining the plurality of external identifiers, such as the first external identifier 242 and the second external identifier 250, are associated with the user based on a match of the identifying information 246 of the user. For example, at least a portion of the identifying information 246 of the user provided in association with the first external identifier 242 by the first data source 240 may match a portion of the identifying information 246 of the user provided in association with the second external identifier 250 by the second data source 248. At step 226, the method 221 may include generating the common identifier 254 for the user that excludes the identifying information 246 of the user. For example, the common identifier 254 may be a random sequence of alphanumeric characters generated by the identity resolution system 122. At step 228, the method 221 may include generating and providing, to the candidacy determination system 116, the key 256 associating the plurality of external identifiers, such as the first external identifier 242 and the second external identifier 250, with one another and the common identifier 254.

Additionally, at step 230, the method 221 may include storing the identifying information 246 of the user in association with the key 256 and/or at least the common identifier 254 in one or more of the second data storage systems 124. Such storage may facilitate identity resolution provided by the identity resolution system 122 as the pre-screening system 112, and more specifically, the fulfillment system 118 is processing a pre-screen request as described in more detail with reference to FIGS. 3A-3C below.

Returning to concurrently referring to FIGS. 2A and 2C, at step 206, the method 200 of FIG. 2A performed by the candidacy determination system 116 may include consolidating external data of the user that is associated with the common identifier 254 using the key 256 to, for example, generate consolidated external data 262. In some examples, the consolidated external data 262 may be generated through a consolidation process 260 performed by an extract, transform, and load (ETL) system 258 of the candidacy determination system 116. For example, the key 256 may be used to determine each of the external identifiers associated with the user, such as the first external identifier 242 and the second external identifier 250. The data received from the external data sources 126 that are associated with the external identifiers determined to be associated with the user, such as the first data 244 associated with the first external identifier 242 and the second data 252 associated with the second external identifier 250, may then be consolidated or joined to generate the consolidated external data 262.

To provide a non-limiting, illustrative example, the first data 244 may include a plurality of credit-related data attributes for the user collected and/or synthesized by the first data source 240. The second data 252 may include the same or similar types of credit-related data attributes for the user collected and/or synthesized by the second data source 248. As part of the consolidation process 260, values of one or more same or similar data attributes from the first data 244 and the second data 252 may be further processed and/or joined to generate a single value for the respective data attribute across the first data source 240 and the second data source 248 to be included in the consolidated external data 262.

In some examples, and as shown in FIG. 2C, the consolidated external data 262 may be provided as input into one or more processes performed by the ETL system 258, such as processes 266 associated with running models and/or deriving features, to generate additional data types for consideration in the candidacy determinations. For example, the consolidated external data 262 may be input into one or more trained machine learning models retrieved from one or more of the first data storage systems 114 to generate one or more scores 268. Additionally or alternatively, one or more feature derivation rules may be applied to the consolidated external data 262 to derive one or more features 270 from the consolidated external data 262. The scores 268 and/or features 270 may be associated with the common identifier 254 for the user to enable the scores 268 and/or features 270 to be joined with the consolidated external data 262 for use in candidacy determinations, as described in detail below.

In further examples, internal data of the user may be considered along with the consolidated external data 262, the scores 268, and/or the features 270 in the candidacy determinations. Optional steps 208-214 of method 200 of FIG. 2A may be performed by the candidacy determination system 116 to anonymize any internal data for the user that is to be considered in the candidacy determinations. If more than one type of internal data is to be considered, optional steps 208-214 of the method 200 may be repeated for each type of internal data. Internal data may include any data collected by the first provider 113, such as data collected by the account services system 110 for storage in one or more of the first data storage systems 114. Additionally or alternatively, the internal data may include any data collected by a third party system on behalf of the first provider 113 (e.g., including non-anonymous external data provided by one or more of the external data sources 126) and received for storage in one or more of the first data storage systems 114. In some examples, at least optional steps 208 and 210 may be performed by an internal data anonymization system 276 of the candidacy determination system 116, as shown in FIG. 2C.

Continuing to refer to FIGS. 2A and 2C concurrently, at optional step 208, the method 200 of FIG. 2A may include receiving internal data 278 of the user from an internal data source, such one of the first data storage systems 114. The internal data 278 may include a relevant data portion (e.g., third data 282), an internal identifier 280 (e.g., ID3), and the identifying information 246 (e.g., PII) of the user. The third data 282 may be a portion of the internal data 278 relevant for consideration in the candidacy determinations. The internal identifier 280 may be randomly generated and excludes any of the identifying information 246 of the user. The identifying information 246 of the user included in the internal data 278 may include more or less types of PII than the types of PII included in the identifying information 246 of the user provided by the external data sources 126. However, at least one of the types of PII included in the identifying information 246 of the user may be the same across the external data sources 126 and internal data source.

At optional step 210, the method 200 may include dividing the internal data 278 into a first dataset 284 and a second dataset 286. The first dataset 284 may include the internal identifier 280 and the identifying information 246 of the user, but excludes the relevant data portion (e.g., the third data 282). The second dataset 286 may include the internal identifier 280 and the relevant data portion (e.g., the third data 282), but excludes the identifying information 246 of the user. At optional step 212, the method 200 may include, in response to providing the first dataset 284 and the second dataset 286 to the identity resolution system 122, receiving a third dataset 288 including the relevant data portion (e.g., the third data 282) from the second dataset 286 and the common identifier 254.

Optional steps 232 and 234 of the method 221 of FIG. 2B describe aspects related to the generation of the third dataset 288 by the identity resolution system 122. For example, turning now to FIG. 2B and FIG. 2C, at optional step 232, the method 221 of FIG. 2B may include receiving, from the candidacy determination system 116, the first dataset 284 and the second dataset 286. At optional step 234, the method 221 may then include generating and providing, to the candidacy determination system 116, the third dataset 288. For example, the internal identifier 280 included in each of the first dataset 284 and the second dataset 286 may enable the identity resolution system 122 to associate the first dataset 284 and the second dataset 286 with one another. The identifying information 246 of the user included in the first dataset 284 may be used to retrieve the common identifier 254 for the user. For example, the identity resolution system 122 may use the identifying information 246 of the user to query one of the second data storage systems 124 that is storing the association of the identifying information 246 of the user with the key 256 and/or the common identifier 254 to retrieve the common identifier 254. The retrieved common identifier 254 may then be included in the third dataset 288 along with the relevant data portion (e.g., the third data 282) extracted from the second dataset 286 associated with the first dataset 284.

Inclusion of the common identifier 254 in the third dataset 288 may allow the candidacy determination system 116 to identify the relevant data portion (e.g., the third data 282) as being associated with the same user as the first data 244 and second data 252 while continuing to preserve the anonymity of the user. For example, returning to the method 200 for candidacy determinations of FIG. 2A, at optional step 214, the method 200 may include joining the relevant data portion of the internal data 278 (e.g., the third data 282) with the consolidated external data 262 of the user using the common identifier 254. In examples where the scores 268 and/or the features 270 are generated from the consolidated external data 262, the scores 268 and/or the features 270 may also be joined with the relevant data portion of the internal data 278 (e.g., the third data 282) and the consolidated external data 262 using the association of the scores 268 and/or the features 270 with the common identifier 254.

At least steps 202-206 and optionally steps 208-214 of the method 200 of FIG. 2A, as well as at least steps 222-230 and optionally steps 232-234 of the method 221 of FIG. 2B, may be repeated for each user of a plurality of users to enable joining of any and all data of each respective user that is relevant to the candidacy determinations. Resultantly, referring to FIGS. 2A and 2C concurrently, at step 216, the method 200 of FIG. 2A may include generating a data pool 274 including aggregated data 272 for each of the plurality of users. For a given user, the aggregated data 272 may include the consolidated external data 262, any additional data generated from the consolidated external data 262, such as the scores 268 and/or the features 270, as well as any relevant portions of the internal data 278, such as the third data 282. The aggregated data 272 for the user may be associated with the common identifier 254 within the data pool 274. Therefore, the data pool 274 may comprise a plurality of sets of aggregated data 272 associated with a plurality of common identifiers 254 corresponding to the plurality of users.

The data pool 274 may be stored in a subset of one or more data stores of the first data storage systems 114. Data access to the subset of the data stores storing the data pool 274 may be controlled by the one or more access control layers 115 in order to restrict access to data in the data pool 274 to only approved users (e.g., administrative users) associated with the first provider 113 (e.g., based on roles, entitlements, and/or credentials). Specifically, if an administrative user is given access to the anonymized data in the data pool 274, the administrative user may be restricted from accessing any non-data pool data in the first data storage systems 114 that includes non-anonymized data or known user identifying information. Such access control may help to prevent the administrative user, who may be a potential bad actor, from gaining access to both the anonymized data and the non-anonymized data, and using any data overlaps between the two to attempt to determine an identity of users associated with the anonymized data.

In some examples, a plurality of candidate datasets 294 corresponding to the plurality of users may be generated from the data pool 274. For example, each one of the candidate datasets 294 may be a record including the common identifier 254 and the aggregated data 272 for one of the plurality of users from the data pool 274. The various types of data forming the aggregated data 272 may be identified within the record based on a source file for the data and an associated timestamp when the data was received and/or generated.

At step 218, the method 200 may include processing the data pool 274 to determine, from the plurality of users, a subset of candidate users for each of a plurality of offer sets. In some examples, processing of the data pool 274 may include processing of the candidate datasets 294 generated from the data pool 274. Each offer set may include one or more products or services offered by the first provider 113. Candidacy for each offer set may be based on variable candidacy criteria. As illustrated in FIG. 2C, a campaign execution system 290 of the candidacy determination system 116 may apply a plurality of campaign rules associated with the respective candidacy criteria of each offer set to the plurality of sets of aggregated data 272 in the data pool 274 (or candidate datasets 294) to determine the subset of candidate users. For example, a portion of the sets of aggregated data 272 in the data pool 274 (or candidate datasets 294) may be identified as meeting the respective candidacy criteria for each offer set based on the application of the rules. The portion of common identifiers 254 associated with the portion of the sets of aggregated data 272 in the data pool 274 (or candidate datasets 294) may indicate the subset of candidate users.

The campaign rules may include inclusionary rules. Example inclusionary rules for an offer set may be that a candidate user has a credit-related score included in the consolidated external data 262 above a predefined threshold value and/or a model-obtained score from the scores 268 above a predefined threshold value. The campaign rules may also include exclusionary or suppressive rules. An example exclusionary or suppressive rule for the offer set may be to exclude from candidacy a user that has already been offered and/or applied for a number of products or services from the first provider 113 that exceeds a predefined threshold number. The number of products or services that the user has been offered and/or applied for may be a type of internal data of the user that can be anonymized and joined as part of the aggregated data 272, as described with reference to optional steps 208-214 of the method 200.

At step 220, the method 200 may include generating and providing, to the identity resolution system 122, a plurality of candidacy lists 292 for the plurality of offer sets. Each candidacy list 292 may include the subset of common identifiers 254 for the subset of candidate users determined for the respective offer set (e.g., the portion of common identifiers 254 associated with the portion of the sets of aggregated data 272 identified as meeting the respective candidacy criteria for respective offer set). In some examples, each candidacy list 292 may include or otherwise be associated with an identifier of the respective offer set the list corresponds to (e.g., an offer set identifier) that is generated by the candidacy determination system 116. Additionally, each candidacy list 292 may include metadata describing or otherwise referencing a subset of the candidate datasets 294 corresponding to the subset of common identifiers 254 that include the aggregated data 272 that was used to make the candidacy determinations.

As described in more detail below with reference to FIGS. 4A-4C, an entirety of the candidate datasets 294 generated from the data pool 274 may be provided to the identity resolution system 122 along with the candidacy lists 292. At least a portion of the candidate datasets 294 may later be included by the identity resolution system 122 as part of analytics data that is provided to and used by the analytics system 120 to perform one or more reconciliation processes.

In some examples, the candidacy lists 292 and candidate datasets 294 may also be stored in one of the first data storage systems 114.

Turning back to FIG. 2B, step 236 of the method 221 describes aspects related to the receipt of the candidacy lists 292 by the identity resolution system 122. For example, at step 236, the method 221 may include receiving, from the candidacy determination system 116, and storing the plurality of candidacy lists 292 for the plurality of offer sets. The candidacy lists 292 may be stored in one or more of the second data storage systems 124 for subsequent retrieval and use to provide identity resolution in association with processing of a pre-screen request by the candidacy determination system 116, as described in detail with references to FIGS. 3A-3C below. In some examples, when each candidacy list 292 includes or is otherwise associated with an offer set identifier of the respective offer set that the list corresponds to, the candidacy lists 292 may be stored in association with the offer set identifiers to facilitate retrieval of an appropriate one or more of the candidacy lists 292.

The candidate datasets 294 may also be stored in one or more of the second data storage systems 124 for subsequent retrieval and use to provide analytics data, as described in detail with references to FIGS. 4A-4C below.

The methods 200, 221 and corresponding conceptual diagram 238 described above are provided merely as examples for determining user candidacy for offer sets, and may include additional, fewer, different, or differently arranged steps than depicted in FIGS. 2A-2C.

Figure 3A:
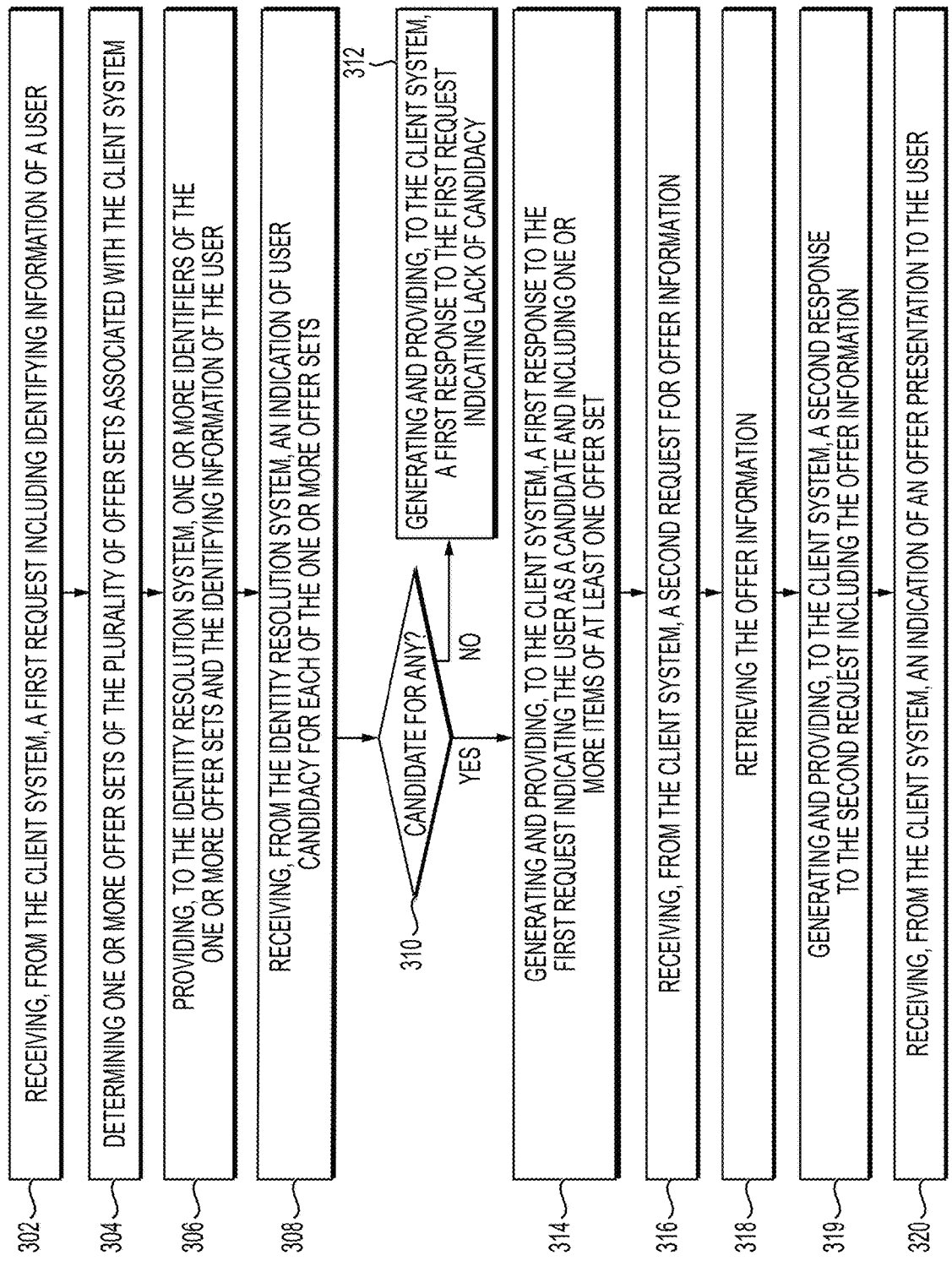
FIG. 3A depicts an example method for request processing, according to certain aspects.
Figure 3B:
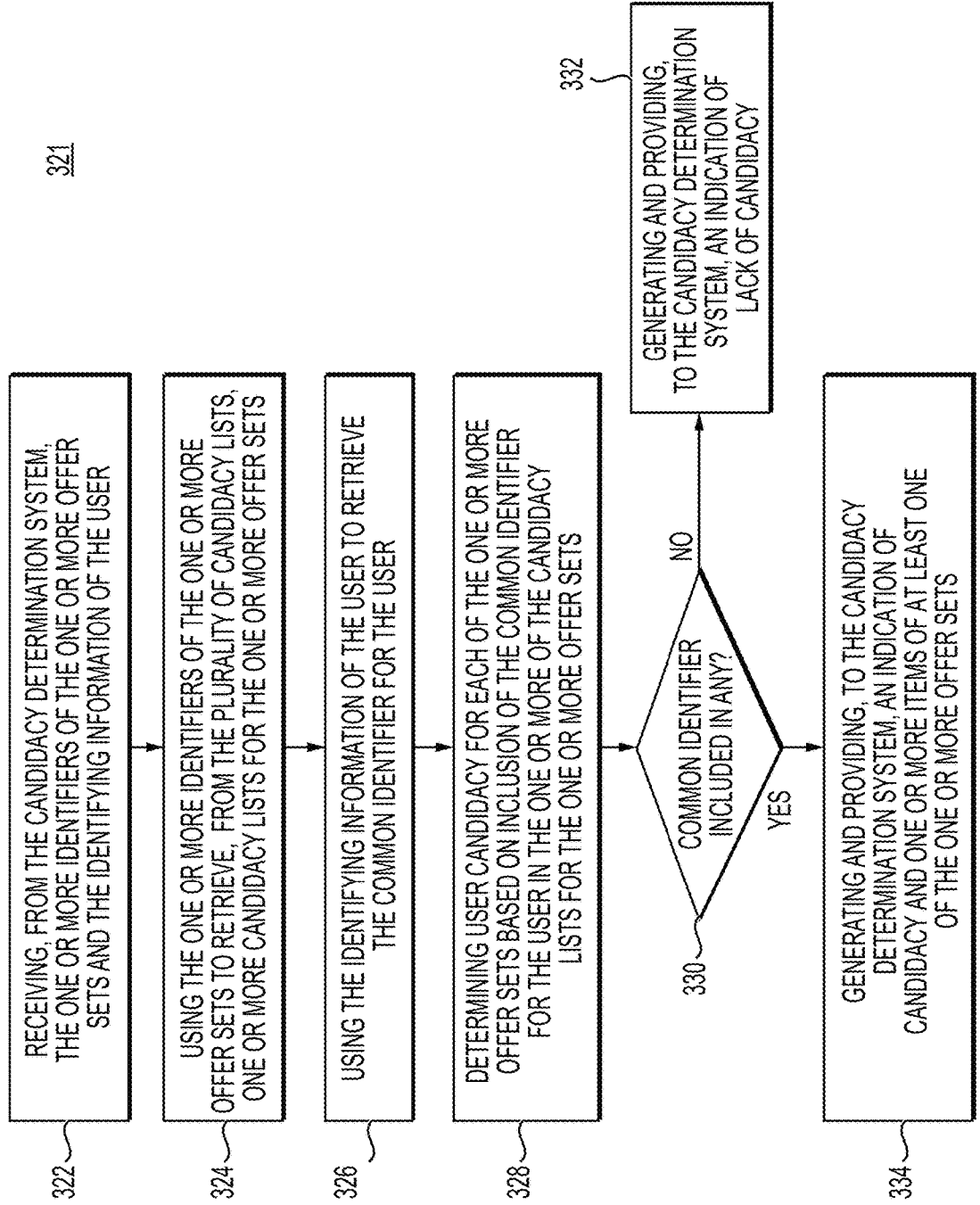
FIG. 3B depicts an example method for providing identity resolution in the request process of FIG. 3A, according to certain aspects.
Figure 3C:
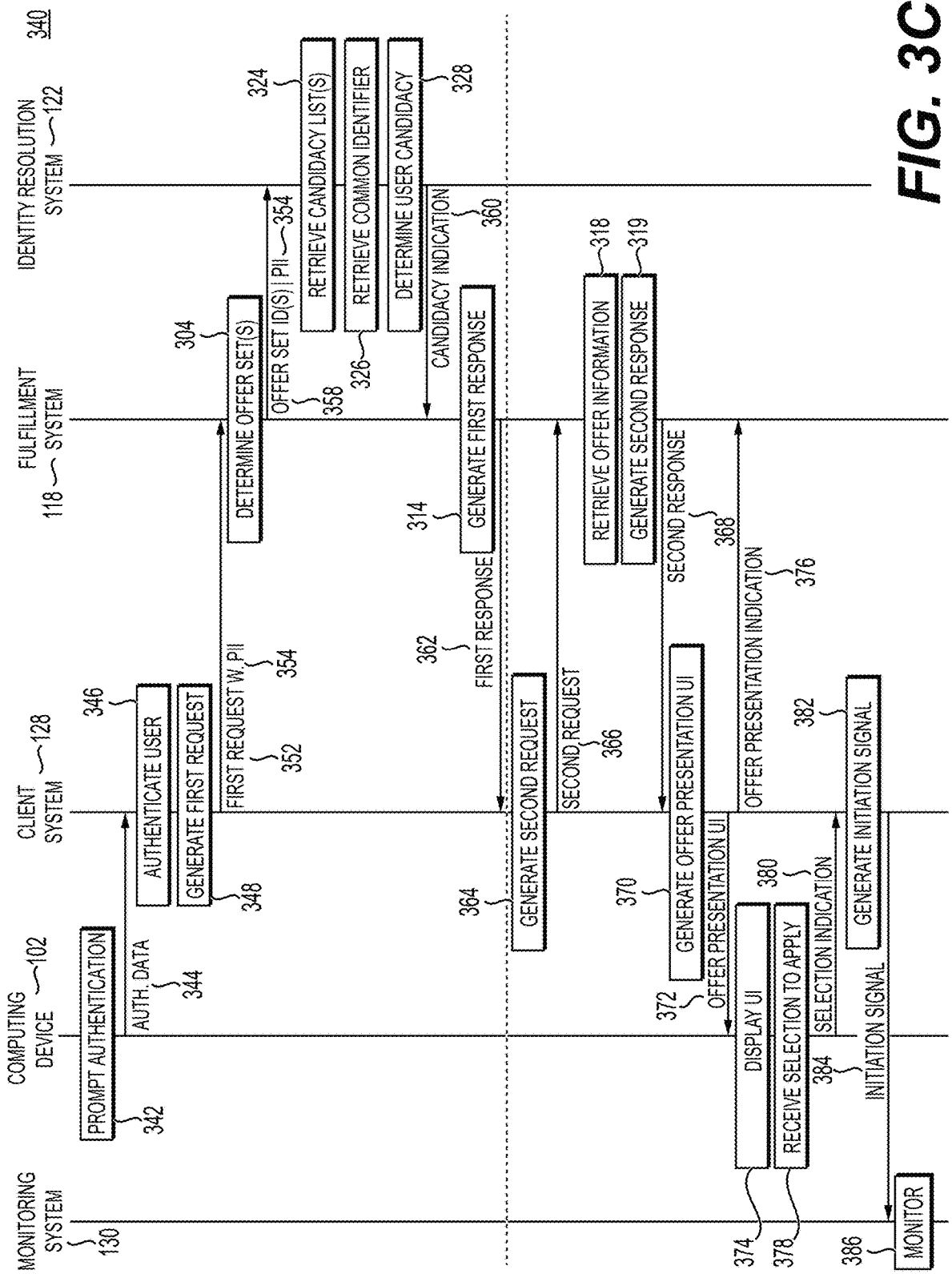
FIG. 3C depicts a conceptual diagram of the example methods described in FIGS. 3A and 3B, according to certain aspects.

FIG. 3A depicts an example method 300 for request processing. FIG. 3B depicts an example method 321 for providing identity resolution in the request processing of FIG. 3A. In some examples, various steps of the method 300 may be performed by the fulfillment system 118 of the pre-screening system 112, while various steps of the method 321 may be performed by the identity resolution system 122. FIG. 3C depicts a conceptual diagram 340 of the example methods 300, 321 described in FIGS. 3A and 3B to illustrate the interactions among various components of the environment 100, including the computing device 102, the client system 128, the fulfillment system 118, the identity resolution system 122, and the monitoring system 130.

Referring concurrently to FIGS. 3A and 3C, at step 302, the method 300 of FIG. 3A may include receiving, from the client system 128, a first request 352 including identifying information 354 (e.g., PII) of a user. The first request 352 may be a pre-screen request. For purposes of this example, the user may be the user associated with computing device 102 or the user whom the agent is interacting with via the computing device 102. The identifying information 354 of the user included in the first request 352 may include at least a portion of the identifying information 246 of the user that is stored in association with the key 256 and/or the common identifier 254 for the user in one or more of the second data storage systems 124 associated with the second provider 123. The portion of the identifying information 354 included in the first request 352 is simply passed by the fulfillment system 118 onto the identity resolution system 122 for use as described with reference to step 306. The identifying information 354 is not persisted in any form within any systems of the first provider 113 to help ensure anonymity of the user is preserved. In some examples, the first request 352 may also include a request identifier (e.g., a pre-screen identifier). As discussed in more detail with respect to FIGS. 4A-4C below, the request identifier may be utilized to associate and store information associated with the first request 352 in pre-screen logs for use in one or more reconciliation processes.

In some examples, and as shown in FIG. 3C, the first request 352 may be generated in response to authentication of the user through the client application 104 executing on the computing device 102. For example, at step 342, authentication of the user may be prompted via the client application 104. The prompt may request input of authentication data 344. Dependent on the context, the authentication data 344 may include identifying information of the user (e.g., a name and an address) and/or user account credentials with the client system 128 from which similar identifying information of the user may be obtained. As one example, when the computing device 102 is a device of or associated with the user and the user has an account with the client system 128, the user may be prompted to enter account credentials upon the computing device 102 launching or navigating to the client application 104 (e.g., via a login user interface). As another example, when the computing device 102 is a device of an agent interacting with the user, the agent may verbally request identifying information from the user to input to the computing device 102. The authentication data 344 of the user provided as input responsive to the prompt may then be provided from the computing device 102 to the client system 128 via the client application 104. The authentication data 344 may be used by the client system 128 to authenticate the user at step 346. Upon authentication, the client system 128 may generate the first request 352 at step 348. The identifying information 354 of the user included in the first request 352 may be information obtained from the authentication of the user at step 346 (e.g., from the authentication data 344 and/or information obtained using the authentication data 344). In some examples, the identifying information 354 may include at least a name and an address of the user that is appended to the first request 352.

Returning to referring concurrently to FIGS. 3A and 3C, at step 304, the method 300 may include determining one or more offer sets of the plurality of offer sets associated with the client system 128. The offers sets associated with the client system 128 may be a subset of the offer sets provided by the first provider 113 that are made available to or the client system 128 is otherwise authorized to present to candidate users. At step 306, the method may include providing, to the identity resolution system 122, one or more identifiers of the one or more offer sets determined at step 304 (e.g., offer set IDs 358) and the identifying information 354 of the user included in the first request 352. At step 308, an indication of user candidacy (e.g., a candidacy indication 360) for each of the one or more offer sets may be received from the identity resolution system 122.

Steps 322-334 of the method 221 of FIG. 2B describe aspects of identity resolution performed by the identity resolution system 122 related to determining a candidacy of the user for the one or more offer sets. For example, referring now concurrently to FIGS. 2B and 2C, at step 322, the method 221 may include receiving, from the candidacy determination system 116, the one or more identifiers of the one or more offer sets (e.g., the offer set IDs 358) and the identifying information 354 of the user.

At step 324, the method 321 may include using the one or more identifiers of the one or more offer sets (e.g., the offer set IDs 358) to retrieve, from the plurality of candidacy lists 292, one or more candidacy lists 292 for the one or more offer sets. The candidacy lists 292 for the offer sets may be stored in association with the offer set identifiers (e.g., the offer set IDs 358) in one or more of the second data storage systems 124, as described above in step 236 of the method 221. Therefore, the identity resolution system 122 may query the one or more of the second data storage systems 124 using the offer set IDs 358 of the one or more offer sets to retrieve the one or more candidacy lists 292 for the one or more offer sets.

At step 326, the method 321 may include using the identifying information 354 of the user to retrieve the common identifier 254 for the user. As previously discussed, the identifying information 354 included in the first request 352 and received by the identity resolution system 122 at step 322 may include at least a portion of the identifying information 246 of the user. The identifying information 246 may be stored in association with the key 256 and/or the common identifier 254 in one or more of the second data storage systems 124, as described above in step 230 of the method 221. Therefore, the identity resolution system 122 may query the one or more of the second data storage systems 124 using the identifying information 354 of the user to retrieve the common identifier 254 associated with the identifying information 246 that at least partially matches the identifying information 354.

At step 328, the method 321 may include determining user candidacy for each of the one or more offer sets based on inclusion of the common identifier 254 for the user in the one or more of the candidacy lists 292 for the one or more offer sets. At decision 330, a determination is made as to whether the common identifier 254 is included in any of the candidacy lists 292 for the one or more offer sets (e.g., and thus whether the identity of the user of the common identifier 254 as maintained within the identity resolution system 122 and associated second data storage systems 124 is a candidate for the offer sets). If the common identifier 254 is determined not to be included in any of the candidacy lists 292 at decision 330, at step 332, the method 321 may include generating and providing, to the candidacy determination system 116, an indication of lack of candidacy (e.g., as the candidacy indication 360).

If the common identifier 254 is determined to be included in at least one of the candidacy lists 292 at decision 330, at step 334, the method 321 may include generating and providing, to the candidacy determination system 116, an indication of candidacy (e.g., as the candidacy indication 360). The indication of candidacy may be associated with at least one of the one or more identifiers of the one offer sets (e.g., one of the offer set IDs 358) corresponding to the at least one of the candidacy lists 292 that included the common identifier 254 of the user.

Returning to referring to FIGS. 2A and 2C concurrently, once the candidacy indication 360 for each of the one or more offer sets has been received, the fulfillment system 118 may utilize the candidacy indication 360 to generate a first response 362 to the first request 352. The first response 362 may include the request identifier (e.g., the pre-screen identifier) included in the first request 352 to enable the client system 128 to associate the first response 362 to the first request 352. For example, at decision 310, the method 300 of FIG. 3A may include determining whether the user is a candidate for any of the one or more offer sets. The determination may be based on the candidacy indication 360 received for each of the one or more offer sets at step 308.

If the user is determined not to be a candidate for any of the one or more offer sets at decision 310, the method 300 may proceed to step 312. At step 312, the method 300 may include generating and providing, to the client system 128, the first response 362 to the first request 352 indicating a lack of candidacy. The method 300 may then end. For example, and as illustrated by the dashed line in FIG. 3C, once the client system 128 receives the first response 362, the client system 128 may perform no further actions associated with pre-screening and/or offer presentation.

If the user is determined to be a candidate for at least one offer set of the one or more offer sets at decision 310, the method 300 may proceed to step 314. At step 314, the method 300 may include generating and providing, to the client system 128, the first response 362 to the first request 352 indicating the user as a candidate for the at least one offer set and including one or more items of the at least one offer set. In other words, the first request 352 may translate the offer set to one or more items of the offer set that may be known or understood by the client system 128. In some examples, identifiers of the one or more items may be included in the first response 362. Example identifiers of the one or more items may include stock keeping units (SKUs), brand codes, or other similar item identifiers.

At step 316, the method 300 may include receiving, from the client system 128, a second request 366 for offer information. For example, at step 364 shown in FIG. 3C, the client system 128 may generate the second request 366. In some examples, the client system 128 may generate the second request 366 based on or responsive to the first response 362. For example, the receipt of the first response 362 indicating the user as a candidate may directly cause or trigger the generation of the second request 366. In such examples, the second request 366 may include a client identifier associated with the client system 128 and/or the one or more items of the at least one offer set included in the first response 362. In other examples, the client system 128 may iteratively generate and send the second request 366 to the fulfillment system 118 at predefined intervals (e.g., hourly, daily, weekly, etc.). In such examples, the second request 366 may include the client identifier associated with the client system 128. The client system 128 may then cache or otherwise store offer information that is included in a second response 368 generated by the fulfillment system 118 in response to the second request 366, as described in more detail below.

At step 318, the method 300 of FIG. 3A may include retrieving the offer information. For example, the fulfillment system 118 may use the client identifier included in the second request 366 to query the one or more of the first data storage systems 114 to retrieve offer information for any and all items of the one or more offer sets associated with the client system 128 (e.g., the one or more offer sets that the client system 128 is authorized to present). As an alternative example, when second request 366 includes the one or more items of the at least one offer set from the first response 362, the one or more items of the at least one offer set may be used to query the one or more of the first data storage systems 114 to retrieve offer information specifically for the one or more items of the at least one offer set. Example offer information for a given item may include but is not limited to, terms, rewards, bonus, rates, restrictions, etc.

At step 319, the method 300 may include generating and providing, to the client system 128, a second response 368 to the second request 366 including the offer information. In some examples, when the second request 366 is iteratively generated and sent by the client system 128 at predefined intervals, the offer information may be cached or otherwise stored by the client system 128 for subsequent retrieval and use, as described below.

At step 320, the method 300 may include receiving, from the client system 128, an indication of offer presentation to the user (e.g., offer presentation indication 376). The offer presentation indication 376 may provide an acknowledgement or confirmation to the fulfillment system 118 that the offer information has in fact been presented to the user. In some examples, the offer presentation indication 376 and/or a separate indication may further indicate interactions of the user with the offer presented (e.g., accept, decline, ignore, etc.).

Referring now exclusively to FIG. 3C, the client system 128 may be configured to generate an offer presentation user interface (UI) 372 at step 370. In some examples, when the receipt of the first response 362 triggers or directly causes the generation of the second request 366, the offer information for the one or more items of the at least one offer set included in the second response 368 may be extracted. The offer presentation UI 372 may be generated based on at least a portion of the extracted offer information. In other examples, when the offer information for each item of the one or more offer sets associated with the client system 128 included in the second response 368 is cached or otherwise stored at predefined intervals, the client system 128 may retrieve a subset of the cached offer information that is associated with the one or more items of the at least one offer set included in the first response 362 to generate the offer presentation UI 372. The offer presentation UI 372 may be generated based on at least a portion of the subset of the cached offer information.

Figure 5:
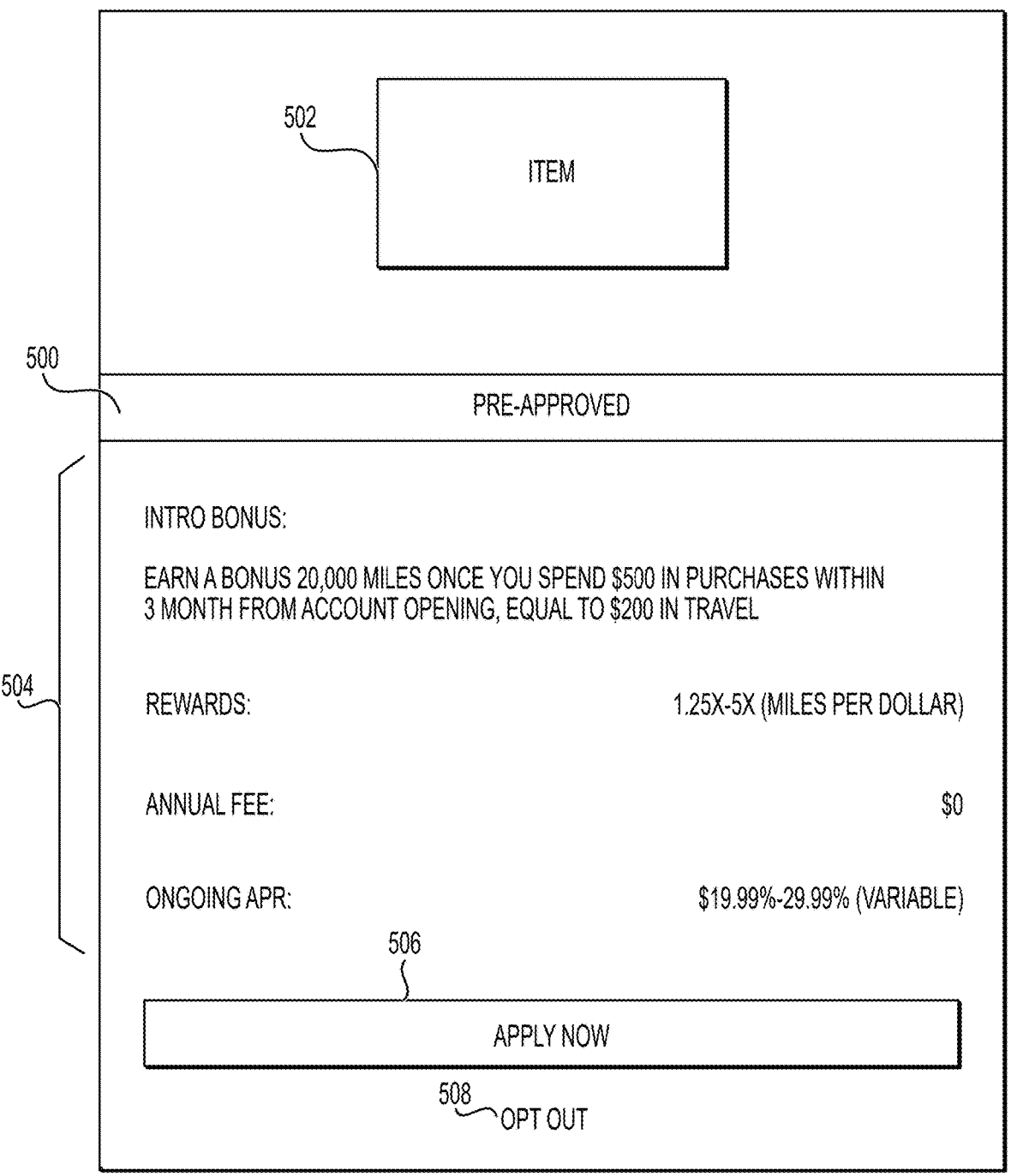
FIG. 5 depicts an example of an offer presentation user interface, according to certain aspects

Additionally, the offer presentation UI 372 may be generated based on or more compliance rules to help ensure the offer information is presented in a manner that is compliant with one or more regulations. An example offer presentation UI 372 is shown in FIG. 5, below. The client system 128 may provide the offer presentation UI to the computing device 102 via the client application 104. The client application 104 may display the offer presentation UI 372 on the computing device 102 at step 374. Further, based on the offer presentation UI 372 being provided to the computing device 102 for display, the client system 128 may provide the offer presentation indication 376 (e.g., generated as part of step 370) to the fulfillment system 118.

In some examples, the user may select to apply for the offer via the displayed offer presentation UI 372. For example, the presentation UI 372 may include an apply control element that may be selected. In response to receiving the selection to apply at step 378, the computing device 102 may provide an indication of the selection to apply (e.g., a selection indication 380) to the client system 128 via the client application 104. Based on the receipt of the selection indication 380, the client system 128 may generate an initiation signal 384 at step 382 to provide to the monitoring system 130. The monitoring system 130 may initiate a monitoring of the application process at step 386 based on the initiation signal 384. As part of the monitoring, the monitoring system 130 may collect application process information that is provided to one or more systems (not shown in FIG. 1) associated with the first provider 113 for subsequent review and analysis. Example types of the application process information collected may include information associated with referrals and/or a payment process performed as part of the application process, and compliance information. In addition to the application process monitoring performed by the monitoring system 130, other monitoring processes may be independently implemented by the client system 128, the pre-screening system 112, and/or the identity resolution system 122.

Figure 4A:
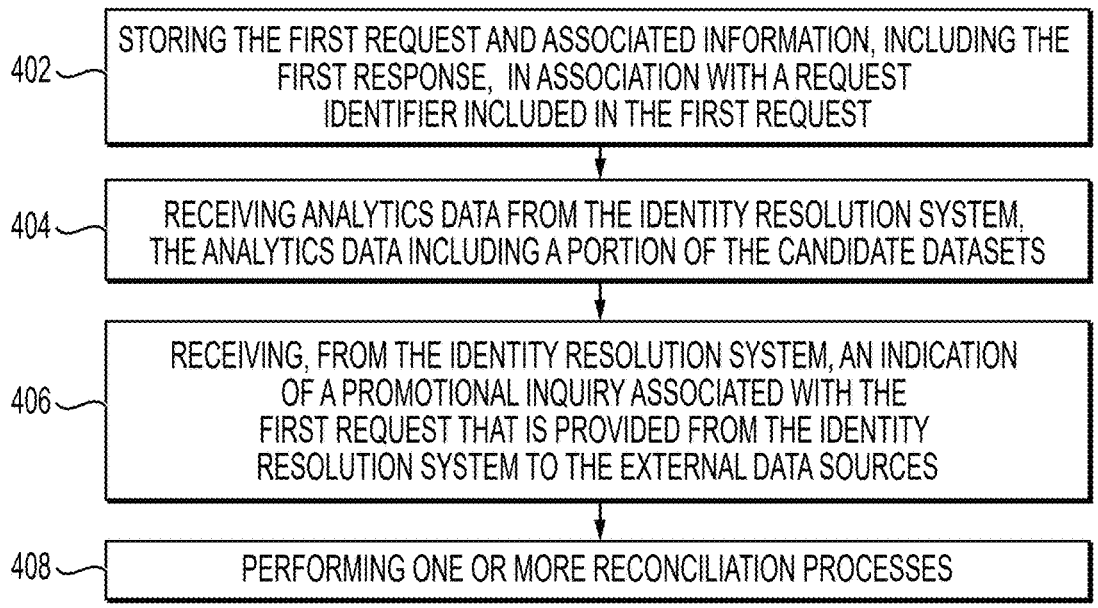
FIG. 4A depicts an example method for performing one or more reconciliation processes, according to certain aspects.
Figure 4B:
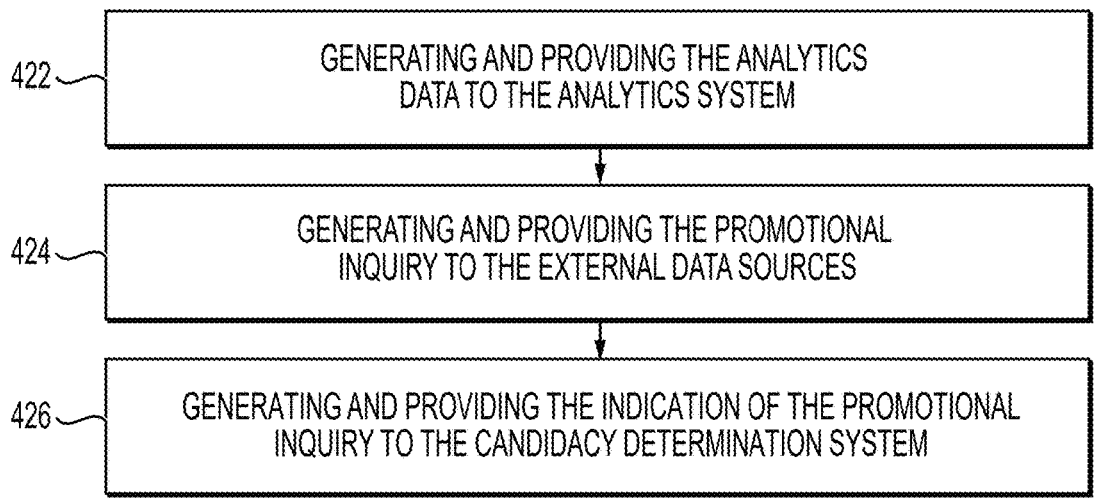
FIG. 4B depicts an example method for providing identity resolution to facilitate the one or more reconciliation processes of FIG. 4A, according to certain aspects.

FIG. 4A depicts an example method 400 for performing one or more reconciliation processes. FIG. 4B depicts an example method 420 for providing identity resolution to facilitate the performance of the one or more reconciliation processes of FIG. 4A. In some examples, various steps of the method 400 may be performed by the analytics system 120 of the pre-screening system 112, while various steps of the method 420 may be performed by the identity resolution system 122. FIG. 4C depicts a conceptual diagram 430 of the example methods 400, 420 described in FIGS. 4A and 4B to illustrate the interactions among various components of the environment 100, including the analytics system 120, the identity resolution system 122, and the external data sources 126.

Figure 4C:
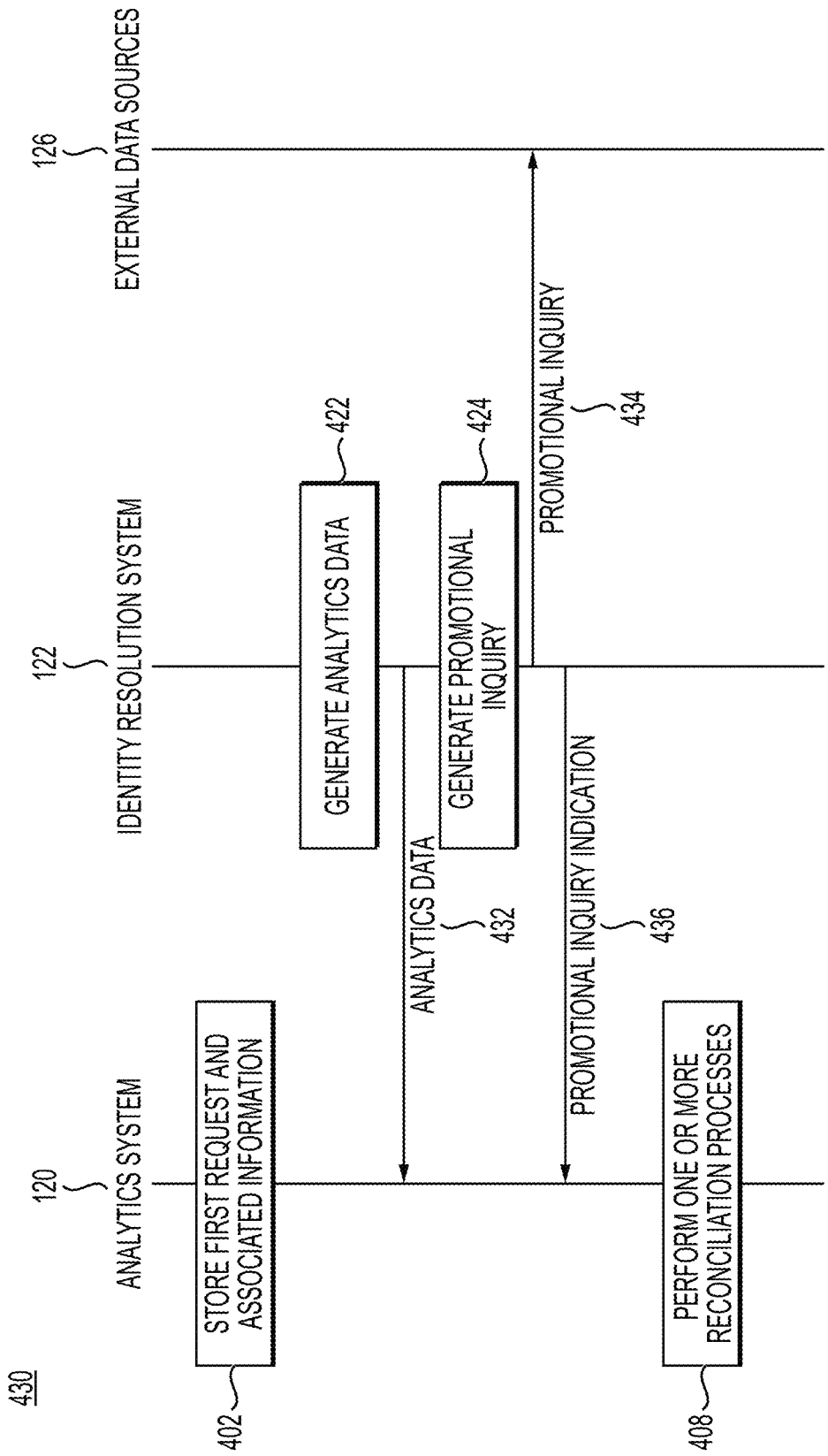
FIG. 4C depicts a conceptual diagram of the example methods described in FIGS. 4A and 4B, according to certain aspects.

Referring concurrently to FIGS. 4A and 4C, at step 402, the method 400 of FIG. 4A may include storing the first request 352 and associated information, including the first response 362, in association with a request identifier (e.g., the pre-screen identifier) included in the first request 352. For example, the first request 352 and associated information may be stored as a pre-screen log in one or more of the first data storage systems 114, where the pre-screen log is stored in association with the pre-screen identifier.

At step 404, the method 400 may include receiving analytics data 432 from the identity resolution system 122. At step 406, the method 400 may include receiving, from the identity resolution system 122, an indication of a promotional inquiry 434 associated with the first request 352 provided from the identity resolution system 122 to the external data sources 126 (e.g., a promotional inquiry indication 436).

The analytics data 432 and the promotional inquiry indication 436 may be generated by the identity resolution system 122. For example, turning to FIGS. 4B and 4C, at step 422, the method 420 may include generating and providing the analytics data 432 to the analytics system 120. The analytics data 432 generated by the identity resolution system 122 may include a portion of the candidate datasets 294, and may be generated at predefined intervals (e.g., daily, weekly, etc.). Once generated, the analytics data 432 may also be stored in one or more of the second data storage systems 124.

As briefly described above, in addition to the candidacy lists 292, the identity resolution system 122 may receive and store the candidate datasets 294 in the one or more second data storage systems 124. Each one of the candidate datasets 294 may be a record including a common identifier 254 and the aggregated data 272 for one of the plurality of users included in the data pool 274. The various types of data forming the aggregated data 272 may be identified within the record based on a source file for the data and an associated timestamp when the data was received and/or generated.

In association with each iteration of the steps 324, 326, and 328 of method 321 as described with reference to FIG. 3B, when facilitating the processing of the first request 352, the identity resolution system 122 may write or otherwise store data in one or more of the second data storage systems 124 that indicates at least the identifying information 354 of the user included in the first request 352, the corresponding common identifier 254 retrieved for the user, and one or more of the candidacy lists 292 in which the common identifier 254 was included (e.g., the candidacy lists 292 corresponding to the offer sets for which the user was determined a candidate and presented an offer for responsive to the first request 352).

Additionally, the candidacy lists 292 received and stored by the identity resolution system 122 may include metadata describing or otherwise referencing a subset of the candidate datasets 294 corresponding to the subset of common identifiers 254 that include the aggregated data that was used to make the candidacy determinations for the corresponding offer sets. Therefore, to generate the analytics data 432, for each first request 352 processed within the predefined interval, the identity resolution system 122 may retrieve at least the common identifier 254 and the candidacy lists 292 indicated in association with the first request 352 from one or more of the second data storage systems 124. The identity resolution system 122 may then use the metadata of the candidacy lists 292 in conjunction with the common identifier 254 to look up or identify a candidate dataset 294, from the candidate datasets 294 stored in the second data storage systems 124. The candidate dataset 294 identified may represent the aggregated data 272 (e.g., including the source files and associated timestamps for the various data types forming the aggregated data 272) for the user associated with the first request 352 that was used by the campaign execution system 290 to make the candidacy determination and include the common identifier 254 for the user in the candidacy list 292. The candidate dataset 294 identified may be included in the analytics data 432.

Additionally, at step 424, the method 420 may include generating and providing the promotional inquiry 434 associated with the first request 352 to the external data sources 126. To generate the promotional inquiry 434, the identifying information 354 of the user included in the first request 352 that is written to the one or more of the second data storage systems 124 in association with the first request 352 may be retrieved by the identity resolution system 122 and included in the promotional inquiry 434 to identify the user associated with the first request 352. In some examples, the identity resolution system 122 may retrieve other information of the user to include in the promotional inquiry 434. For example, the external identifiers (e.g., the first external identifier 242 and the second external identifier 250) provided by the external data sources 126 may be retrieved using at least a portion of the identifying information 354 (e.g., the portion matching the identifying information 246 provided by the external data sources 126) and included in the promotional inquiry 434 to further identify the user associated with the first request 352. The promotional inquiry 434 may indicate to the external data sources 126 that data of the user provided by the external data sources 126 was used to determine candidacy of the user for an offer set. The promotional inquiry 434 may be any form of reporting to meet regulatory compliance. In some examples, a plurality of promotional inquiries 434 may be generated prior to sending to the external data sources 126 in a batched manner. The batching may be based on a pre-defined time interval similar to the analytics data 432 and/or may be based on a number or volume of promotional inquiries.

At step 426, the method 420 may include generating and sending the promotional inquiry indication 436 to the analytics system 120. The promotional inquiry indication 436 may indicate to the analytics system 120 that the promotional inquiry 434 has in fact been provided to the external data sources 126 and thus regulatory compliance has been maintained.

Returning back to referring to FIGS. 4A and 4C concurrently, at step 408, the method 400 may include performing one or more reconciliation processes. The reconciliation processes may be performed based on the stored first request 352 and associated information, the analytics data 432, and/or the promotional inquiry indication 436. A first reconciliation process may include, for each first request 352 received, using the stored first request 352 and the associated information to confirm a respective first response 362 was generated. A second reconciliation process may include an analysis of the analytics data 432, including the portion of the candidate datasets 294. For example, the aggregated data 272 within the portion of the candidate datasets 294 may be decrypted and analyzed to determine an accuracy of the campaign execution system 290 in generating the candidacy lists 292 (e.g., are the candidacy lists 292 over inclusive or under inclusive). A third reconciliation process may include confirming that for each of the first requests 352 received, a corresponding promotional inquiry 434 has been provided to the external data sources 126 using the promotional inquiry indication 436.

FIG. 5 depicts an example of the offer presentation UI 372. The user offer presentation UI 372 may be displayed by the client application 104 executing on the computing device 102. The offer presentation UI 372 may include a pre-screen indicator 500 that indicates the user is a candidate for an item of the first provider 113 (e.g., the user has been pre-approved, pre-selected, pre-screened). The offer presentation UI 372 may include an item identifier 502, such as a name and/or photograph, along with item information 504. The item identifier 502 and/or the item information 504 may be at least a portion of the offer information included in the second response 368 that was received and used by the client system 128 to generate the offer presentation UI 372. To provide a non-limiting example, when the item is a credit card of the first provider 113, the item information 504 may include an introductory bonus, rewards, an annual fee, and an annual percentage rate (APR). The offer presentation UI 372 may also include control element 506 that may be selected by the user to initiate an application process. Additionally, the offer presentation UI 372 may include an opt out element 508 that may be selected by the user to indicate they do not consent to any future pre-screenings. In some examples, the opt out element 508 may be a feature included for regulatory compliance.

The offer presentation UI 372 described above is provided merely as an example, and may include additional, fewer, different, or differently arranged information and/or interactive control elements than depicted in FIG. 5.

In general, any process or operation discussed in this disclosure that is understood to be computer-implementable, such as the processes or operations depicted in FIGS. 2A-5, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a data storage device, such as a drive, disk, or a memory of the computer system. A processor may be a central processing unit (CPU), a graphics processing unit (GPU), or any suitable type of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 6:
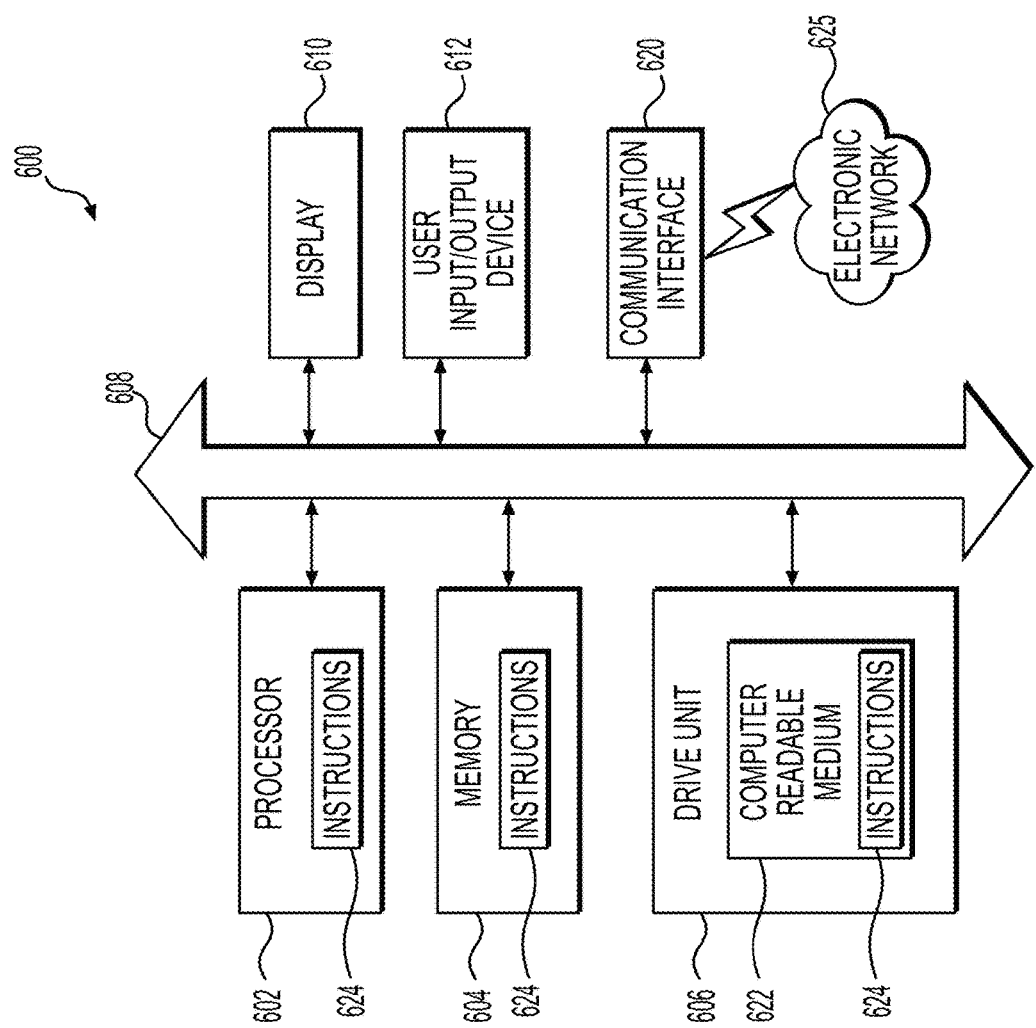
FIG. 6 depicts an example of a computer, according to certain aspects.

FIG. 6 depicts an example of a computer 600, according to certain embodiments. FIG. 6 is a simplified functional block diagram of a computer 600 that may be configured as a device for executing processes or operations depicted in, or described with respect to, FIGS. 2A-5, according to exemplary embodiments of the present disclosure. For example, the computer 600 may be configured as the computing device 102, one of the server-side systems 108, and/or another device according to exemplary embodiments of this disclosure. In various embodiments, any of the systems herein may be a computer 600 including, e.g., a data communication interface 620 for packet data communication. The computer 600 may communicate with one or more other computers 600 using the electronic network 625. The electronic network 625 may include a wired or wireless network similar to the network 106 depicted in FIG. 1.

The computer 600 also may include a central processing unit ("CPU"), in the form of one or more processors 602, for executing program instructions 624. The program instructions 624 may include instructions for running one or more applications, including the client application 104 associated with the client system 128 (e.g., if the computer 600 is the computing device 102). The program instructions 624 may include instructions for running one or more operations of the server-side systems 108 (e.g., if the computer 600 is a server device or other similar computing device of one or more of the respective server-side systems 108). The computer 600 may include an internal communication bus 608, and a drive unit 606 (such as read-only memory (ROM), hard disk drive (HDD), solid-state disk drive (SDD), etc.) that may store data on a computer readable medium 622, although the computer 600 may receive programming and data via network communications. The computer 600 may also have a memory 604 (such as random access memory (RAM)) storing instructions 624 for executing techniques presented herein, although the instructions 624 may be stored temporarily or permanently within other modules of computer 600 (e.g., processor 602 and/or computer readable medium 622). The computer 600 also may include user input and output ports 612 and/or a display 610 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, e.g., may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be understood that embodiments in this disclosure are exemplary only, and that other embodiments may include various combinations of features from other embodiments, as well as additional or fewer features.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method performed by a first system for determining offer candidacy, the method comprising:
   receiving, from a first data source, first external data of a user associated with a first identifier;
   receiving, from a second data source, second external data of the user associated with a second identifier, wherein, based on information included within the first external data and the second external data, the first system is unable to identify the first external data and the second external data as data of the user;
   receiving, from a second system knowing the first identifier, the second identifier, and identifying information of the user, a key that associates the first identifier, the second identifier, and a common identifier for the user generated by the second system to preserve an anonymity of the user at the first system;
   generating, using the association of the first identifier and the second identifier provided by the key, consolidated external data for the user that (i) includes the first external data and the second external data and (ii) is associated with the common identifier;
   providing, to the second system, non-anonymized third internal data of the user that includes at least a portion of the identifying information of the user known by the second system, wherein the second system uses the portion of the identifying information of the user to identify the common identifier for the user;
   receiving, from the second system, an anonymized dataset including the third internal data and the common identifier but excluding the portion of the identifying information of the user;
   generating, using the association of the consolidated external data with the common identifier and the common identifier included in the anonymized dataset, aggregated data that includes the consolidated external data and the third internal data from the anonymized dataset; and
   processing the aggregated data to determine the user is a candidate for an offer set.

2. The method of claim 1, further comprising:
   receiving an internal dataset of the user from a data store associated with the first system, wherein the internal dataset of the user includes the third internal data, a third identifier, and the portion of the identifying information of the user.

3. The method of claim 2, wherein providing, to the second system, the non-anonymized third internal data of the user comprises:
   dividing the internal dataset into a first dataset and a second dataset, wherein the first dataset includes the third identifier and the portion of the identifying information but excludes the third internal data, and wherein the second dataset includes the third identifier and the third internal data but excludes the portion of the identifying information; and
   providing, to the second system, the first dataset and the second dataset, wherein the second system uses the portion of the identifying information from the first dataset to determine the common identifier, and generates the anonymized dataset including the third internal data from the second dataset and the common identifier.

4. The method of claim 2, wherein the data store associated with the first system storing the internal dataset is a first data store, and the method further comprises:
   storing the aggregated data as a part of a data pool in a second data store associated with the first system; and
   limiting access to one or more of the first data store and the second data store using one or more access control layers.

5. The method of claim 1, wherein the second system generates the key by:

receiving, from the first data source, the identifying information of the user associated with the first identifier;
receiving, from the second data source, the identifying information of the user associated with the second identifier;
determining the first identifier and the second identifier are associated with the user based on a match of the identifying information of the user; and
based on the determination:
  generating the common identifier for the user; and
  associating the first identifier, the second identifier, and the common identifier in the key.

6. The method of claim 1, further comprising:
applying one or more trained models to the first external data and the second external data to obtain one or more scores, wherein the one or more scores are included in the aggregated data of the user.

7. The method of claim 1, further comprising:
applying one or more feature derivation rules to obtain one or more derived features, wherein the one or more derived features are included in the aggregated data of the user.

8. The method of claim 1, wherein the processing of the aggregated data comprises:
receiving a plurality of rules associated with the offer set; and
applying the plurality of rules to the aggregated data to determine the user as a candidate for the offer set.

9. The method of claim 1, further comprising:
generating a candidacy list for the offer set that includes the common identifier for the user; and
providing the candidacy list to the second system.

10. The method of claim 1, further comprising:
generating a candidate dataset for the user including the common identifier and the aggregated data; and
providing the candidate dataset to the second system, wherein the second system is configured to generate and provide, to the first system, analytics data including the identifying information of the user and the candidate dataset for use in one or more reconciliation processes.

11. The method of claim 1, wherein the information included within the first external data and the second external data excludes the identifying information of the user.

12. A method performed by a candidacy determination system, the method comprising:
receiving, from a first data source, anonymized first external data of a user including a first identifier;
receiving, from a second data source, anonymized second external data of the user including a second identifier;
receiving, from an identity resolution system having respectively received each of the first identifier and the second identifier in association with matching identifying information of the user from the first data source and the second data source, a key that associates the first identifier, the second identifier, and a common identifier with the user without providing an identity of the user;
generating, using the association of the first identifier and the second identifier provided by the key, consolidated external data for the user that (i) includes the anonymized first external data and the anonymized second external data and (ii) is associated with the common identifier;
providing, to the identity resolution system, non-anonymized third internal data of the user that includes at least a portion of the identifying information of the user known by the identity resolution system, wherein the identity resolution system uses the portion of the identifying information of the user to identify the common identifier for the user;
receiving, from the identity resolution system, an anonymized dataset including the third internal data and the common identifier but excluding the portion of the identifying information of the user;
generating, using the association of the consolidated external data with the common identifier and the common identifier included in the anonymized dataset, aggregated data that includes the consolidated external data and the third internal data from the anonymized dataset; and
determining the user is a candidate for an offer set based on the aggregated data.

13. The method of claim 12, wherein providing, to the identity resolution system, the non-anonymized third internal data of the user comprises:
receiving an internal dataset of the user from a data store associated with the candidacy determination system, wherein the internal dataset of the user includes the third internal data, a third identifier, and the portion of the identifying information of the user;
dividing the internal dataset into a first dataset and a second dataset, wherein the first dataset includes the third identifier and the portion of the identifying information but excludes the third internal data, and wherein the second dataset includes the third identifier and the third internal data but excludes the portion of the identifying information; and
providing, to the second system, the first dataset and the second dataset, wherein the second system uses the portion of the identifying information from the first dataset to determine the common identifier, and generates the anonymized dataset including the third internal data from the second dataset and the common identifier.

14. The method of claim 13, wherein the data store associated with the candidacy determination system storing the internal dataset of the user is a first data store, and the method further comprises:
storing the aggregated data as a part of a data pool in a second data store associated with the candidacy determination system; and
using one or more access control layers to control access to the first data store and the second data store, wherein a given administrative user is unable to access both the first data store and the second data store.

15. The method of claim 12, wherein the common identifier for the user is generated by the identity resolution system, and included as part of the key, to enable the key to associate the first identifier and the second identifier with the user without providing the identity of the user.

16. A method for providing identity resolution, the method comprising:
receiving, from a first data source, identifying information of a user associated with a first identifier;
receiving, from a second data source, the identifying information of the user associated with a second identifier;
determining the first identifier and the second identifier are associated with the user based on a match of the identifying information of the user;
generating a key associating the first identifier, the second identifier, and a common identifier for the user;

providing the key to a candidacy determination system, wherein the identifying information of the user is unobtainable from the key to preserve an anonymity of the user at the candidacy determination system, and the candidacy determination system:
- uses the association of the first identifier and the second identifier provided by the key to generate consolidated external data that (i) includes first external data associated with the first identifier received from the first data source and second external data associated with the second identifier received from the second data source, and (ii) is associated with the common identifier;

receiving, from the candidacy determination system, non-anonymized third internal data of the user that includes at least a portion of the identifying information of the user to enable identification of the common identifier for the user; and generating and providing, to the candidacy determination system, an anonymized dataset including the third internal data and the common identifier but excluding the portion of the identifying information of the user, wherein the candidacy determination system:
- generates, using the association of the consolidated external data with the common identifier and the common identifier included in the anonymized dataset, aggregated data that includes the consolidated external data and the third internal data from the anonymized dataset, and
- processes the aggregated data to determine the user is a candidate for an offer set.

17. The method of claim 16, wherein, to preserve the anonymity of the user at the candidacy determination system, the method further comprising:
generating the common identifier for the user; and
storing the identifying information of the user in association with at least the common identifier.

18. The method of claim 17, further comprising:
receiving, from the candidacy determination system, and storing a candidacy list for the offer set that includes the common identifier for the user; and
receiving, from the candidacy determination system, a candidate dataset for the user including the common identifier and the aggregated data, wherein the candidacy list references the candidate dataset.

19. The method of claim 18, further comprising:
generating and providing, to the candidacy determination system, analytics data including the identifying information of the user and the candidate dataset for use in one or more reconciliation processes.

20. The method of claim 17, wherein receiving, from the candidacy determination system, the non-anonymized third internal data of the user comprises:
receiving, from the candidacy determination system, a first dataset and second dataset divided from an internal dataset stored in a data store associated with the candidacy determination system and including the third internal data, a third identifier, and the portion of the identifying information of the user, wherein the first dataset includes the third identifier and the portion of the identifying information but excludes the third internal data, and wherein the second dataset includes the third identifier and the third internal data but excludes the portion of the identifying information;
using the portion of the identifying information from the first dataset to determine the common identifier; and
generating the anonymized dataset including the third internal data from the second dataset and the common identifier.

* * * * *